United States Patent
Higgins et al.

(10) Patent No.: US 8,280,766 B2
(45) Date of Patent: *Oct. 2, 2012

(54) TARGETED DISTRIBUTION OF ELECTRONIC COUPONS

(75) Inventors: Christopher W. Higgins, Portland, OR (US); Marc E. Davis, San Francisco, CA (US); Robert C. Trout, Burlingame, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,000

(22) Filed: Aug. 26, 2011

(65) Prior Publication Data

US 2012/0016729 A1 Jan. 19, 2012

Related U.S. Application Data

(63) Continuation of application No. 11/944,914, filed on Nov. 26, 2007.

(51) Int. Cl.
*G06Q 30/00* (2012.01)

(52) U.S. Cl. ..................... 705/14.1; 705/14.13

(58) Field of Classification Search .................. 705/14.1, 705/14.13
See application file for complete search history.

(56) References Cited

U.S. PATENT DOCUMENTS

| | | | |
|---|---|---|---|
| 6,061,660 A | 5/2000 | Eggleston et al. | |
| 6,434,534 B1 * | 8/2002 | Walker et al. | 705/14.13 |
| 6,718,289 B1 * | 4/2004 | Suzuki et al. | 703/2 |
| 6,970,871 B1 * | 11/2005 | Rayburn | 1/1 |
| 7,107,236 B2 * | 9/2006 | Lei | 705/26.81 |
| 7,698,420 B2 * | 4/2010 | Stebbins | 709/224 |
| 7,774,229 B1 * | 8/2010 | Dernehl et al. | 705/14.16 |
| 7,788,188 B2 * | 8/2010 | Kramer | 705/319 |
| 7,856,360 B2 * | 12/2010 | Kramer et al. | 705/1.1 |
| 2002/0002485 A1 * | 1/2002 | O'Brien et al. | 705/14 |
| 2002/0004754 A1 * | 1/2002 | Gardenswartz et al. | 705/26 |
| 2002/0052778 A1 * | 5/2002 | Murphy et al. | 705/14 |
| 2002/0116266 A1 * | 8/2002 | Marshall | 705/14 |
| 2003/0100315 A1 | 5/2003 | Rankin | |
| 2004/0019518 A1 | 1/2004 | Abraham et al. | |
| 2005/0131761 A1 * | 6/2005 | Trika et al. | 705/14 |
| 2005/0209921 A1 * | 9/2005 | Roberts et al. | 705/14 |

(Continued)

FOREIGN PATENT DOCUMENTS

JP 2002-092482 A 3/2002

(Continued)

OTHER PUBLICATIONS

Extended European Search Report for application No. 10732071.5, dated Jun. 21, 2012, 8 pages.

*Primary Examiner* — Jagdish Patel
*Assistant Examiner* — Sara C Hamilton
(74) *Attorney, Agent, or Firm* — Fiala & Weaver P.L.L.C.

(57) ABSTRACT

A system, method and computer program product is described that matches commercial incentives to consumers based on targeting data associated with the commercial incentive and user data associated with consumers in a manner that advantageously allows for highly-targeted delivery of commercial incentives to the consumers that are most likely to use them. Because both the targeting data and the user data may include spatial, temporal, social and topical data, matching may be performed based on any or all of these data types, as well as based on any combination of these data types.

24 Claims, 21 Drawing Sheets

U.S. PATENT DOCUMENTS

| | | | |
|---|---|---|---|
| 2005/0228719 A1* | 10/2005 | Roberts et al. | 705/14 |
| 2006/0015405 A1* | 1/2006 | Bala et al. | 705/14 |
| 2006/0064346 A1* | 3/2006 | Steenstra et al. | 705/14 |
| 2006/0253453 A1 | 11/2006 | Chmaytelli et al. | |
| 2007/0073580 A1* | 3/2007 | Perry et al. | 705/14 |
| 2007/0162337 A1* | 7/2007 | Hawkins et al. | 705/14 |
| 2007/0179838 A1* | 8/2007 | Marra | 705/14 |
| 2007/0267487 A1* | 11/2007 | Chao | 235/380 |
| 2007/0281692 A1* | 12/2007 | Bucher et al. | 455/435.1 |
| 2008/0027810 A1* | 1/2008 | Lerner et al. | 705/14 |
| 2008/0082396 A1* | 4/2008 | O'Connor et al. | 705/10 |
| 2008/0097826 A1* | 4/2008 | Leach et al. | 705/10 |
| 2008/0097843 A1* | 4/2008 | Menon et al. | 705/14 |
| 2008/0097844 A1* | 4/2008 | Hsu et al. | 705/14 |
| 2008/0097855 A1* | 4/2008 | Rissanen | 705/14 |
| 2008/0140506 A1* | 6/2008 | Christianson et al. | 705/10 |
| 2008/0140509 A1* | 6/2008 | Amjadi | 705/10 |
| 2008/0140520 A1* | 6/2008 | Hyder et al. | 705/14 |
| 2008/0140525 A1* | 6/2008 | Lamsfuss et al. | 705/14 |
| 2008/0154676 A1* | 6/2008 | Suk | 705/7 |
| 2008/0172291 A1* | 7/2008 | Hurowitz et al. | 705/14 |
| 2008/0172292 A1* | 7/2008 | Hurowitz et al. | 705/14 |
| 2008/0215424 A1* | 9/2008 | Guldimann et al. | 705/14 |
| 2008/0215425 A1* | 9/2008 | Guldimann et al. | 705/14 |
| 2008/0215426 A1* | 9/2008 | Guldimann et al. | 705/14 |
| 2008/0221984 A1* | 9/2008 | Abhyanker | 705/14 |
| 2008/0249836 A1* | 10/2008 | Angell et al. | 705/10 |
| 2008/0249857 A1* | 10/2008 | Angell et al. | 705/14 |
| 2008/0249858 A1* | 10/2008 | Angell et al. | 705/14 |
| 2008/0249859 A1* | 10/2008 | Angell et al. | 705/14 |
| 2008/0249863 A1* | 10/2008 | Redmond | 705/14 |
| 2008/0249864 A1* | 10/2008 | Angell et al. | 705/14 |
| 2008/0249866 A1* | 10/2008 | Angell et al. | 705/14 |
| 2008/0262920 A1* | 10/2008 | O'Neill et al. | 705/14 |
| 2008/0319846 A1* | 12/2008 | Leming et al. | 705/14 |
| 2009/0094158 A1* | 4/2009 | Fein et al. | 705/50 |
| 2009/0106085 A1* | 4/2009 | Raimbeault | 705/10 |
| 2009/0106100 A1* | 4/2009 | Mashinsky | 705/14 |
| 2009/0138328 A1* | 5/2009 | Higgins et al. | 705/10 |
| 2009/0138347 A1* | 5/2009 | Higgins et al. | 705/14 |
| 2009/0138348 A1* | 5/2009 | Higgins et al. | 705/14 |
| 2009/0307068 A1* | 12/2009 | Meyerhofer | 705/14.12 |
| 2009/0319363 A1* | 12/2009 | Callaghan et al. | 705/14.36 |
| 2010/0082439 A9* | 4/2010 | Patel et al. | 705/14.72 |
| 2010/0100417 A1* | 4/2010 | Nussel et al. | 705/10 |
| 2010/0179856 A1* | 7/2010 | Paretti et al. | 705/10 |
| 2010/0250357 A1* | 9/2010 | Kim | 705/14.23 |
| 2011/0313829 A1 | 12/2011 | Higgins | |
| 2011/0313841 A1 | 12/2011 | Higgins et al. | |

FOREIGN PATENT DOCUMENTS

| | | | |
|---|---|---|---|
| JP | 2003-141406 | A | 5/2003 |
| KR | 10-2002-0011207 | A | 2/2002 |
| KR | 10-2004-0032289 | A | 4/2004 |
| KR | 10-2007-0055583 | A | 5/2007 |
| TW | 200743046 | A | 11/2007 |
| WO | 2007/090133 | A2 | 8/2007 |
| WO | 2009/070475 | A1 | 6/2009 |
| WO | 2010/083278 | A2 | 7/2010 |
| WO | 2010/083278 | A3 | 10/2010 |

\* cited by examiner

TARGETED DISTRIBUTION OF ELECTRONIC COUPONS

CROSS-REFERENCE TO RELATED APPLICATIONS

This application is a continuation of U.S. patent application Ser. No. 11/944,914, filed Nov. 26, 2007, which is incorporated by reference herein in its entirety.

BACKGROUND OF THE INVENTION

1. Field of the Invention

The present invention generally relates to systems and methods for the distribution, management and redemption of incentives. In particular, the present invention generally relates to systems and methods for the distribution, management and redemption of commercial incentives, including but not limited to electronic discounts, games or personal information management.

2. Background

In marketing, the term "coupon" typically refers to a ticket or document that can be exchanged for something of value, such as a financial discount or rebate, when purchasing a product or service. Coupons are thus intended to incentivize a consumer to purchase the subject product or service. Coupons have traditionally been distributed in paper form through mail, magazines, newspapers, or the like. More recently, coupons have also been distributed to consumers in electronic form via the Internet and via mobile devices such as cellular phones.

From the consumer standpoint, conventional coupon distribution and redemption practices suffer from a number of disadvantages. For example, cutting out and collecting paper coupons is a cumbersome and time-consuming task. Even after clipping a coupon, consumers may nevertheless forget to bring the coupon with them when going to make a purchase, which can be extremely frustrating. Electronic coupons distributed via the Internet suffer from similar issues, since consumers must still take time to print out the electronic coupon and then remember to bring it with them at the time of purchase.

Also, consumers often have a difficult time finding coupons that relate to the products and services in which they are most interested. Many paper coupons are distributed via mass mailings and as magazine and newspaper inserts and thus are not targeted to a particular consumer or groups of consumers. Limited forms of consumer targeting have been used in distributing paper and electronic coupons to consumers (e.g., sending coupons to consumers who have previously purchased the same product or service). However, these limited forms of targeting do not take into account spatial, temporal, social and topical information to more precisely match coupons with the consumers that are most likely to use them. Furthermore, there is currently no mechanism available for rewarding consumers who pass coupons on to other consumers who may be interested in them.

From the perspective of the business operator, conventional coupon distribution and redemption practices also suffer from a number of disadvantages. For example, for the business operator, publishing a coupon is like placing a wager on future business because the terms of the coupon must be fixed prior to publication and because the coupon must be valid for a fixed period of time. Since the terms of the coupon cannot be modified after publication to account for changing business conditions (such as changing sales or inventory levels), there is a substantial amount of guesswork involved in determining whether and/or by how much a particular coupon distribution will benefit a business.

Furthermore, business operators have a difficult time placing coupons into the hands of the consumers most likely to use them. Business operators typically distribute coupons in a manner that is centralized and limited to the venues in which the business operator chooses to publish the coupon. A "buckshot" approach is often used in the hopes that the coupons will come into contact with consumers having an interest in the subject of the coupon. As noted above, some limited methods exist for targeted delivery of coupons to a consumer or group of consumers, but such limited methods do not take into account spatial, temporal, social and topical information to more precisely match coupons with the consumers that are most likely to use them. Furthermore, as noted above, such methods do not provide an incentive for consumers to pass coupons on to other consumers who may be interested in them.

What is needed then is a system and method for the distribution and redemption of incentives, including commercial incentives such as electronic coupons, that overcomes the aforementioned shortcomings associated with conventional coupon distribution and redemption practices.

BRIEF SUMMARY OF THE INVENTION

A system, method and computer program product is described herein for matching commercial incentives to consumers based on targeting data associated with the commercial incentive and user data associated with consumers in a manner that advantageously allows for highly-targeted delivery of commercial incentives to the consumers that are most likely to use them. Because both the targeting data and the user data may include spatial, temporal, social and topical data, matching may be performed based on any or all of these data types, as well as based on any combination of these data types.

In particular, a method is described herein for distributing a commercial incentive to a consumer. In accordance with the method, a commercial incentive and targeting data associated therewith are accessed. User data associated with a consumer is also accessed, wherein the user data comprises at least one of spatial data, temporal data, social data and topical data associated with the consumer. The commercial incentive is then matched to the consumer based at least in part on the targeting data and the user data. The commercial incentive is then distributed to the consumer over a network responsive to the matching step.

In further accordance with the foregoing method, the commercial incentive may obtained from an advertiser while the targeting data may be obtained from the advertiser or inferred from a source, content and/or terms associated with the commercial incentive. The commercial incentive may also be populated into a graph of commercial incentives available for distribution to consumers prior to accessing the commercial incentive.

In one implementation of the foregoing method, the user data includes spatial data corresponding to a current location of the consumer, and the commercial incentive is matched to the consumer by determining if the current location of the consumer is within a target area associated with the commercial incentive.

In another implementation of the foregoing method, the user data includes temporal data, and the commercial incentive is matched to the consumer by determining if the temporal data falls within a target time period associated with the commercial incentive.

In yet another implementation of the foregoing method, the user data includes social data that identifies a group of users with whom the consumer is socially connected, and the commercial incentive is matched to the consumer by determining if another user that has received the commercial incentive is within the group of users with whom the consumer is socially connected.

In still another implementation of the foregoing method, the user data includes topical data that indicates an area of interest of the consumer, and the commercial incentive is matched to the consumer by determining if the commercial incentive relates to the area of interest of the consumer.

A system is also described herein. The system includes a matching manager and a communications manager communicatively connected thereto. The matching manager is configured to access a commercial incentive and targeting data associated with the commercial incentive, to access user data associated with a consumer, wherein the user data comprises at least one of spatial data, temporal data, relationship data and topical data associated with the consumer, and to match the commercial incentive to the consumer based at least in part on the targeting data and the user data. The communications manager is configured to distribute the commercial incentive to the consumer over a network responsive to the performance of the matching function by the matching manager.

The foregoing system may further include a commercial incentive manager. The commercial incentive manager may be configured to obtain the commercial incentive and the targeting data from an advertiser or may be configured to obtain the commercial incentive from an advertiser and to infer the targeting data from a source, content and/or terms associated with the commercial incentive. The foregoing system may also include a distribution manager configured to populate the commercial incentive into a graph of commercial incentives available for distribution to consumers. In such an embodiment, the matching manager is configured to access the commercial incentive by accessing the graph.

A computer program product is also described herein. The computer program product includes a computer-readable medium having computer program logic recorded thereon for enabling a processing unit to distribute a commercial incentive to a consumer. The computer program logic includes first means, second means, third means and fourth means. The first means are configured to enable the processing unit to access a commercial incentive and targeting data associated with the commercial incentive. The second means are configured to enable the processing unit to access user data associated with a consumer, wherein the user data comprises at least one of spatial data, temporal data, social data and topical data associated with the consumer. The third means are configured to enable the processing unit to match the commercial incentive to the consumer based at least in part on the targeting data and the user data. The fourth means are configured to enable the processing unit to distribute the commercial incentive to the consumer over a network responsive to the matching step.

The foregoing computer program logic may further include means for enabling the processing unit to obtain the commercial incentive and the targeting data from an advertiser. Alternatively, the foregoing computer program logic may further include means for enabling the processing unit to obtain the commercial incentive from an advertiser and means for enabling the processing unit to infer the targeting data from a source, content and/or terms associated with the commercial incentive. The foregoing computer program logic may also include means for enabling the processing unit to populate the commercial incentive into a graph of commercial incentives available for distribution to users.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
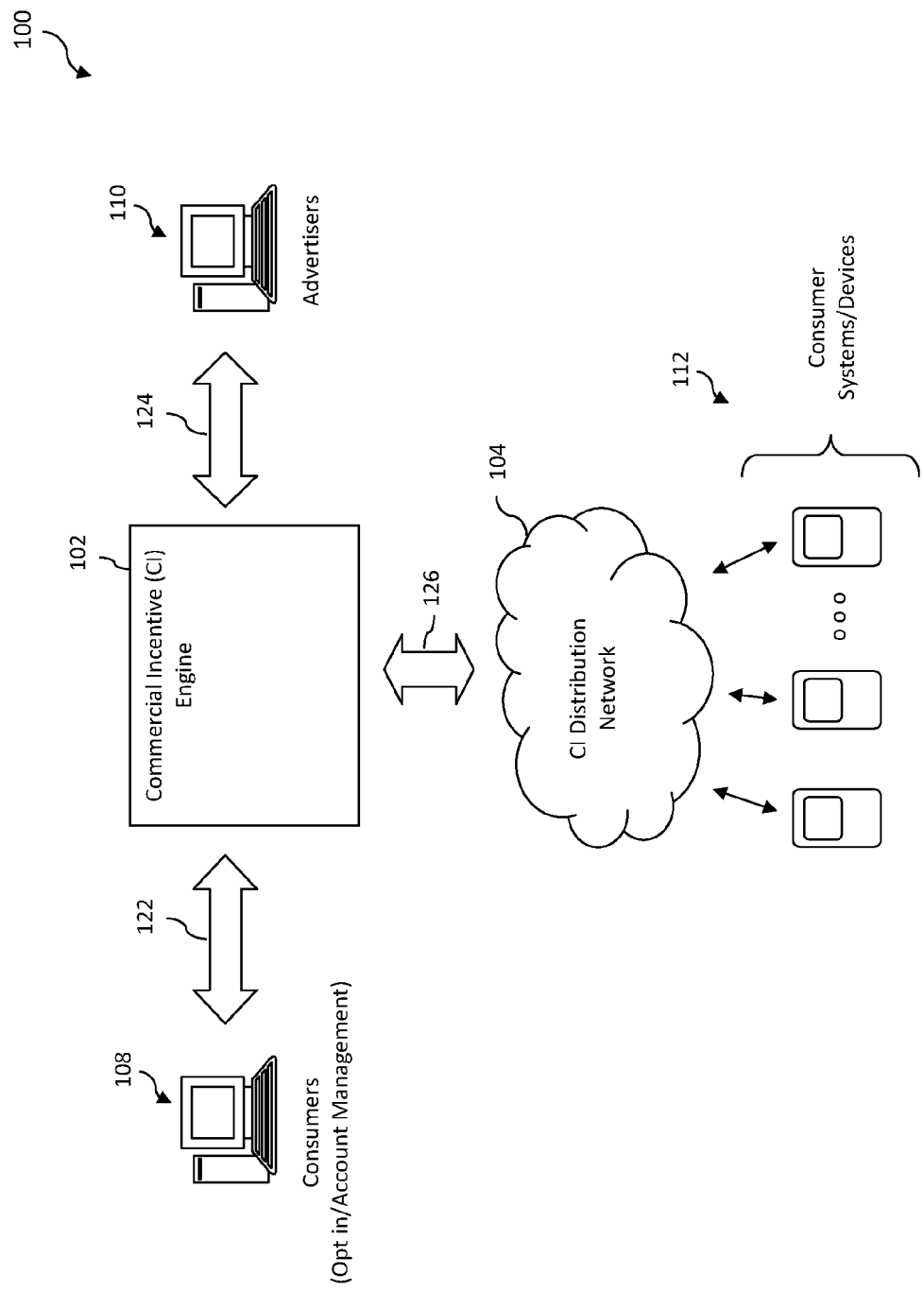
FIG. 1 is a high-level block diagram of a system for the distribution, management and redemption of commercial incentives in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example System Architecture

FIG. 1 is a high-level block diagram of an exemplary system 100 for the distribution, management and redemption of commercial incentives in accordance with one embodiment of the present invention. As used herein, the term "commercial incentive" refers to electronic offers or any other type of inducement that may be transmitted electronically to a consumer and that is intended to motivate the consumer to engage in a commercial activity including but not limited to the purchasing of a product or service. As used herein, the term commercial incentive is not intended to cover paper coupons as described in the Background Section above.

As shown in FIG. 1, system 100 includes a commercial incentive (CI) engine 102 that is communicatively connected to consumers 108 via a first interface 122, to advertisers 110 via a second interface 124, and to a CI distribution network 104 via a third interface 126. Each of the elements of system 100 will now be briefly described, with additional details to be provided in subsequent sections.

First interface 122 is configured to allow consumers 108 to interact with CI engine 102 for the purpose of specifying whether or not they wish to "opt in" to receive commercial incentives from CI engine 102. First interface 122 may be further configured to allow a consumer to provide information to CI engine 102 that is subsequently used by CI engine 102 to determine which commercial incentives will be distributed to the consumer and when such commercial incentives should be distributed. First interface 122 may be still further configured to allow a consumer to perform other management functions relating to the receipt of commercial incentives to be described in more detail herein. In one embodiment of the present invention, first interface 122 comprises an application programming interface (API) that can be used to build applications by which consumer systems/devices interact with CI engine 102, although the invention is not so limited. It should be noted that in certain embodiments of the present invention, first interface 122 is not used and commercial incentives are sent to consumers automatically or, alternatively, the process for opting in is handled via another channel that is not shown in FIG. 1.

Second interface 124 is configured to allow advertisers 110 to interact with CI engine 102 for the purpose of creating commercial incentives for distribution to consumers. Second interface 124 may be further configured to allow advertisers 110 to specify targeting criteria that are used to match commercial incentives to consumers. Second interface 124 may be still further configured to allow an advertiser to modify commercial incentives that have already been distributed to consumers and/or to provide information that is used by CI engine 102 to automatically modify such commercial incentives. Second interface 124 may also be configured to perform other functions to be described in more detail herein. In one embodiment of the present invention, second interface 124 comprises an API that can be used to build applications by which advertiser systems interact with CI engine 102, although the invention is not so limited.

CI engine 102 is a system that is configured to receive commercial incentives from advertisers and to selectively distribute such commercial incentives to consumers via a CI distribution network 104. To this end, CI engine is configured to perform a number of functions including matching of commercial incentives to consumers based on spatial, temporal, social and/or topical information associated with the consumers, dynamically modifying commercial incentives that have already been distributed to consumers, and managing and tracking commercial incentives from creation through redemption or withdrawal by the advertiser who created it.

CI distribution network 104 is a network used by CI engine 102 for the distribution, management and redemption of commercial incentives. Network 104 comprises a plurality of consumer systems/devices 112 that are communicatively connected to CI engine 102 via one or more network nodes and that are configured to receive commercial incentives via the network nodes. Communication between CI engine 102 and CI distribution network 104 takes place over third interface 126. In one embodiment of the present invention, third interface 126 comprises an API that can be used to build applications by which consumer systems/devices 112 can communicate with CI engine 102, although the invention is not so limited.

Figure 2:
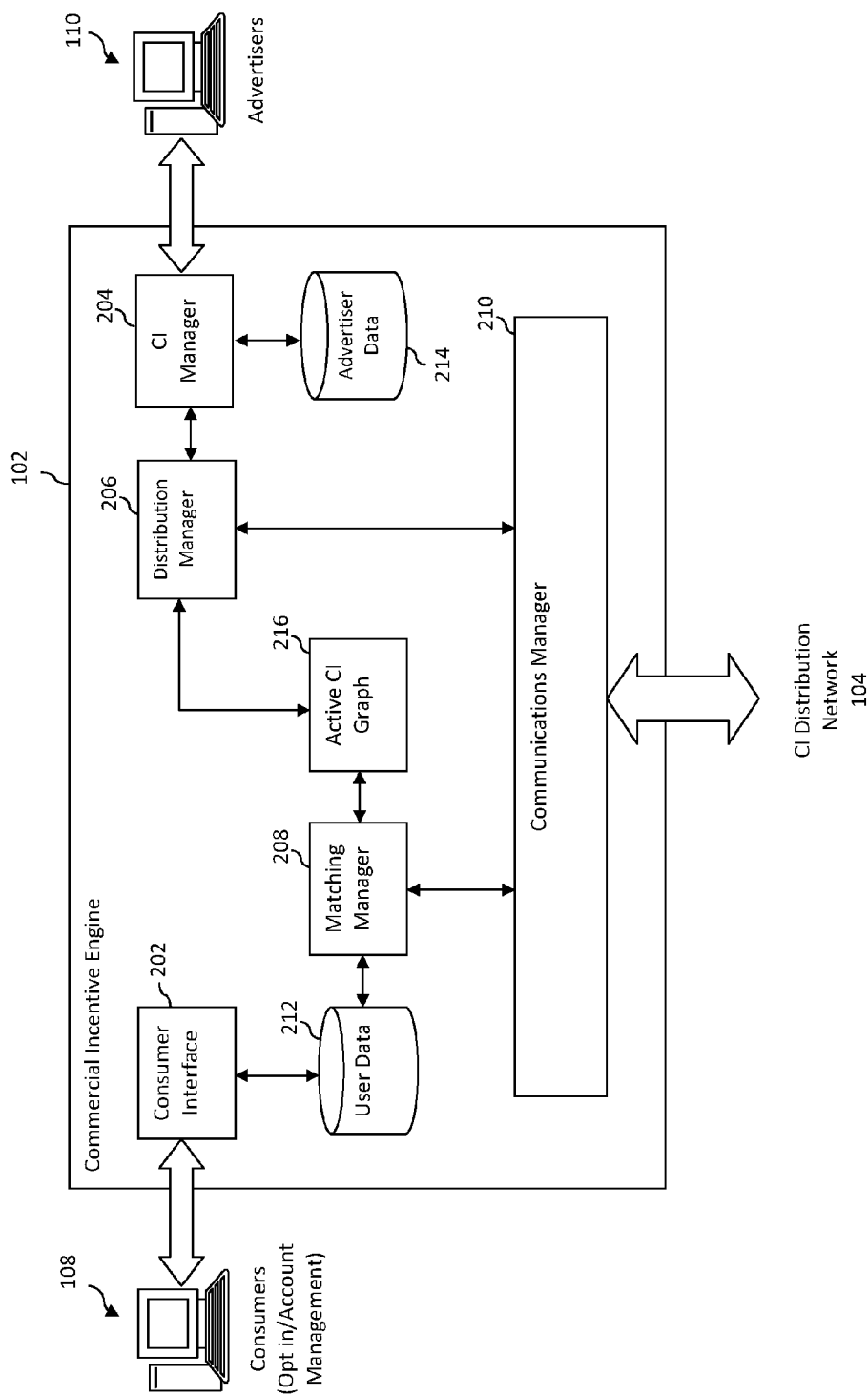
FIG. 2 is a block diagram of a commercial incentive engine in accordance with an embodiment of the present invention.

FIG. 2 depicts commercial incentive engine 102 in more detail. As shown in FIG. 2, commercial incentive engine 102 includes a number of communicatively-connected elements including a consumer interface 202, a CI manager 204, a distribution manager 206, a matching manager 208, a communications manager 210, a user data database 212, an advertiser data database 214, and an active CI graph 216. Each of these elements will now be described.

1. User Data Database 212

User data database 212 is configured to store data associated with particular consumers that is used by CI engine 102 to perform targeted distribution of commercial incentives in a manner to be described in more detail herein. The user data stored in database 212 may be actively provided by a consumer (such as via consumer interface 202), collected from consumer systems/devices 112 via CI distribution network 104 or some other channel, provided to CI engine 102 from some other network, system or database that aggregates such data, or by any combination of the foregoing. An example of a system that uses a sensor network to collect user data of the type stored in user database 212 is described in commonly-owned, co-pending U.S. patent application Ser. No. 11/562,976, entitled "Methods, Systems and Apparatus for Delivery of Media," the entirety of which is incorporated by reference herein.

Figure 3:
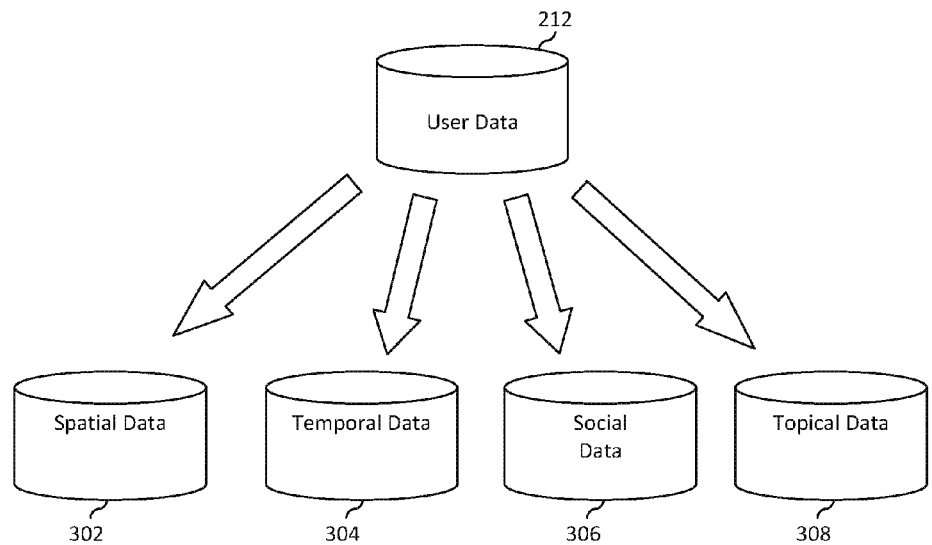
FIG. 3 illustrates different types of user data that may be used to perform targeted distribution of commercial incentives in accordance with an embodiment of the present invention.

As shown in FIG. 3, the user data stored in database 212 may include spatial data 302, temporal data 304, social data 306 and topical data 308. The user data stored in database 212 may also include information deduced or derived from spatial data 302, temporal data 304, social data 306 and topical data 308, as will be discussed in more detail herein.

Spatial data 302 may be any information associated with a location of the user and/or an electronic system/device associated with the user. For example, spatial data 302 may include any passively-collected location data, such as cell tower data, GPRS data, global positioning service (GPS) data, WI-FI data, personal area network data, IP address data and data from other network access points, or actively-collected location data, such as location data entered into a system/device by a user. Spatial data 302 may also include weather data associated with various locations. Spatial data 302 may be obtained by tracking the path and state of consumer systems/devices 112.

Temporal data 304 is time-based data (e.g., time stamps) or metadata (e.g., expiration dates) that relate to specific times and/or events associated with a user and/or an electronic system/device associated with the user. For example, temporal data 304 may include passively-collected time data (e.g., time data from a clock resident on an electronic system/device, or time data from a network clock), or actively-collected time data, such as time data entered by the user of the electronic system/device (e.g., a user-maintained calendar).

Social data 306 may be any data or metadata relating to the relationships of a user of an electronic system/device. For example, social data 306 may include user identity data, such as gender, age, race, name, social security number, photographs and other information associated with the user's identity. User identity information may also include e-mail addresses, login names and passwords. Social data 306 may also include social network data. Social network data includes data relating to any relation of the user of the electronic system/device that is input by a user, such as data relating to a user's friends, family, co-workers, business relations, and the like. Social network data may include, for example, data corresponding with a user-maintained electronic address book. Certain social data may be correlated with, for example, location information to deduce social network data, such as primary relationships (e.g., user-spouse, user-children and user-parent relationships) or other relationships (e.g., user-friends, user-co-worker, user-business associate relationships) and may be weighted by primacy.

Topical data 308 may be any data or metadata concerning subject matter in which a user of an electronic system/device appears to have an interest or is otherwise associated. Topical data 308 may be actively provided by a user (such as via consumer interface 202) or may be derived from other sources.

Both social data 306 and topical data 308 may be derived from interaction data. As used herein, the term interaction data refers to any data associated with interactions carried out by a user via an electronic system/device, whether active or passive. Examples of interaction data include interpersonal communication data, media data, transaction data and system/device interaction data.

Interpersonal communication data may be any data or metadata that is received from or sent by an electronic system/device and that is intended as a communication to or from the user. For example, interpersonal communication data may include any data associated with an incoming or outgoing SMS message, e-mail message, voice call (e.g., a cell phone call, a voice over IP call), or other type of interpersonal communication relative to an electronic system/device, such as information regarding who is sending and receiving the interpersonal communication(s). As described below, interpersonal communication data may be correlated with, for example, temporal data to deduce information regarding frequency of communications, including concentrated communication patterns, which may indicate user activity information.

Media data may be any data or metadata relating to presentable media, such as audio data, visual data and audiovisual data. Audio data may be, for example, data relating to downloaded music, such as genre, artist, album and the like, and may include data regarding ringtones, ring backs, media purchased, playlists, and media shared, to name a few. Visual data may be data relating to images and/or text received by an electronic device (e.g., via the Internet or other network). Visual data may include data relating to images and/or text sent from and/or captured at an electronic system/device. Audiovisual data may include data or metadata associated with any videos captured at, downloaded to, or otherwise associated with an electronic system/device.

Media data may also include media presented to a user via a network, such as via the Internet, data relating to text entered and/or received by a user using the network (e.g., search terms), and data relating to interaction with the network media, such as click data (e.g., advertisement banner clicks, bookmarks, click patterns and the like). Thus, media data may include data relating to a user's RSS feeds, subscriptions, group memberships, game services, alerts, and the like. Media data may also include non-network activity, such as image capture and/or video capture using an electronic device, such as a mobile phone. Image data may include metadata added by a user, or other data associated with an image, such as, with respect to photos, location at which the photos were taken, direction of the shot, content of the shot, and time of day, to name a few. As described in further detail below, media data may be used for example, to deduce activities information or preferences information, such as cultural and/or buying preferences information.

Interaction data may also include transactional data or metadata. Transactional data may be any data associated with commercial transactions undertaken by a user via an electronic system/device, such as vendor information, financial institution information (e.g., bank information), financial account information (e.g., credit card information), merchandise information and cost/prices information, and purchase frequency information, to name a few. Transactional data may be utilized, for example, to deduce activities and preferences information. Transactional information may also be used to deduce types of devices and/or services owned by a user and/or in which a user may have an interest.

Interaction data may also include system/device interaction data and metadata. System/device interaction data may be any data relating to a user's interaction with an electronic system/device not included in any of the above categories, such as data relating to habitual patterns associated with use of an electronic system/device. Example of system/device interaction data include data regarding which applications are used on thane electronic system/device and how often and when those applications are used. As described in further detail below, system/device interaction data may be correlated with temporal data to deduce information regarding user activities and patterns associated therewith.

The user data stored in database 212 may also include deduced information. The deduced information may be deduced based on one or more of spatial data 302, temporal data 304, social data 306, or topical data 308 as described above. The deduced information may thus include information relating to deduced locations and/or deduced activities of the user. For example, the deduced information may comprise one or more of a primary user location, secondary user location, past locations, present location, and predicted future location information. The deduced information may include information deduced based on a correlation of spatial data 302 in conjunction with temporal data 304 to deduce such location data. By way of illustration, spatial data 302 may be correlated with temporal data 304 to determine that a user of an electronic system/device is often at one or more specific locations during certain hours of the day. In a particular embodiment, spatial data 302 is correlated with temporal data 304 to determine a primary user location (e.g., home), a secondary location (e.g., school or work) and/or other locations, as well as a cyclical model for a user's spatial/temporal patterns.

The deduced information may also include activity information, such as past activity information, present activity information, and predicted future activity information. In this regard, the past, present, or predicted future activity information may include information relating to past communications and/or co-locations with other users. By way of example, spatial data 302 may be correlated with temporal data 304 to determine a user's activities (e.g., work, recreation and/or home activities).

The deduced information may also include preferences information. The preferences information may include cultural preferences and/or buying preferences information. The cultural preferences information may be any preferences information relating to the culture of the user, such as gender preferences, ethnicity preferences, religious preferences and/or artistic preferences, to name a few. The buying preferences may be any preferences associated with the buying habits of the user. All preferences may be explicitly provided by a user or implicitly derived from aggregated user and network data.

2. Consumer Interface 202

Consumer interface 202 is a component that is configured to allow a consumer to interact with CI engine 102 from a remote location for the purpose of specifying whether or not the consumer wishes to receive commercial incentives from CI engine 102, as well as to optionally provide other information or perform other functions to personalize commercial incentive distribution/account management. Information provided by a consumer via consumer interface 202 is stored in user data database 212. Consumer interface 202 may be implemented using a Web service and a standard set of Web APIs for utilizing the Web service. Web applications built upon the Web service may be published by an entity that owns and/or operates CI engine 102 or by other entities. Such Web applications are accessed by consumers using Web browsers in a well-known fashion.

The system/device used by the consumer to interact with consumer interface 202 may be any one of consumer systems/devices 112 or some other system/device. In one embodiment, communication between consumers and consumer interface 202 occurs over the Internet. However, the invention is not so limited, and communication between consumers and consumer interface 202 may occur over any type of network or combination of networks including wide area networks, local area networks, private networks, public networks, packet networks, circuit-switched networks, and wired or wireless networks.

As noted above, consumer interface 202 allows a consumer to specify whether or not they wish to "opt in" to receive commercial incentives from CI engine 102. Depending upon the implementation, a consumer may not only specify whether or not they wish to receive commercial incentives from CI engine 102 but also specify other parameters concerning the receipt of commercial incentives such as parameters relating to the amount, frequency, origin, or type of commercial incentives to be received. For example, a consumer may specify that commercial incentives relating to a certain type of product or service should or should not be received or that commercial incentives originating from a particular company or companies should or should not be received. As another example, a consumer may specify that commercial incentives should be received from persons within a particular social network or from persons within a certain "social distance" of the consumer within the given social network. In still another example, a consumer may specify a time period or location at which the consumer wishes to receive commercial incentives. However, these examples are provided by way of illustration only, and persons skilled in the relevant art(s) will appreciate that numerous other parameters, including but not limited to numerous temporal, spatial, social and topical parameters, may be specified by a consumer in regard to the receipt of commercial incentives.

Consumer interface 202 may be further configured to permit a consumer to provide information to CI engine 102 that is not directly related to the receipt of commercial incentives but that is nevertheless used by CI engine 102 to determine which commercial incentives will be distributed to the consumer and when such commercial incentives should be distributed. For example, consumer interface 202 may be configured to request information from the consumer concerning particular areas of interest to the consumer (e.g., in the form of a questionnaire or survey). This information may then used by CI engine 102 to facilitate targeting of commercial incentives in a manner that will be described in more detail herein.

Consumer interface 202 may be still further configured to allow a consumer to perform other management functions relating to the receipt of commercial incentives from CI engine 102. These management functions may include, but are not limited to, specifying one or more electronic systems or devices associated with the consumer that should receive commercial incentives from CI engine 102. Consumer interface 202 may also provide an accounting interface by which a consumer can register for compensation or awards associated with the redistribution of commercial incentives.

In an alternate embodiment of the present invention, CI engine 102 does not include consumer interface 202 as described above. This may be because in such an embodiment, commercial incentives are automatically sent to consumers systems/devices 112 or, alternatively, the process for opting in is handled via another channel.

3. CI Manager 204

CI Manager 204 is a component that is configured to allow an advertiser to interact with CI engine 102 from a remote location for the purpose of creating or otherwise providing one or more commercial incentives for distribution to consumers as well as to perform other functions. Such other functions may include specifying targeting criteria that are used to match commercial incentives to consumers, modifying an existing commercial incentive that has already been distributed to consumers, or providing information that is subsequently used by CI engine 102 to automatically modify a commercial incentive that has already been distributed to consumers. Information provided by an advertiser through interaction with CI manager 204 is stored in advertiser data database 214.

In one embodiment of the present invention, advertisers communicate with CI Manager using applications built upon a predefined API. Such applications may be published by an entity that owns and/or operates CI engine 102 or by other entities. Communication between advertisers and CI manager 204 may occur over the Internet. However, the invention is not so limited, and communication between advertisers and CI manager 204 may occur over any type of network or combination of networks including wide area networks, local area networks, private networks, public networks, packet networks, circuit-switched networks, and wired or wireless networks.

To facilitate the creation of a commercial incentive, CI manager 204 may be configured to allow an advertiser to create, select or provide media content (e.g., copy) to be associated with a commercial incentive such as text, graphics, video or audio content to be associated with the commercial incentive. CI manager 204 may also be configured to allow an advertiser to create, select or input terms associated with the commercial incentive. Such terms may include but are not limited to an identification of the product or service to which the commercial incentive relates, an incentive model (e.g., discount, rebate, "buy one get one free", etc.), a discount amount (expressed in terms of an amount of money or percentage of a price), a rebate amount, a reward amount (e.g., airline miles), duration of an offer, or an identification of additional products or services to be delivered to a consumer upon redemption of the commercial incentive.

CI manager 204 may be further configured to allow an advertiser to modify an existing commercial incentive that has already been distributed to consumers, wherein modifying the existing commercial incentive may include, but is not limited to, adding, deleting, modifying or replacing media content or terms associated with the existing commercial incentive. For example, and without limitation, an advertiser may change one or more elements of the ad copy associated with an existing commercial incentive, increase or decrease a discount amount or rebate amount associated with an existing commercial incentive, reduce or extend the duration of an offer, or even terminate an offer.

In addition to providing an advertiser with the ability to create commercial incentives and modify existing commercial incentives that have already been distributed to consumers, CI manager 204 may be configured to permit an advertiser to specify targeting information associated with one or more commercial incentives. Such targeting information may include but is not limited to an identification of a particular demographic to which the commercial incentive(s) are directed, wherein the demographic may be based on any variable including but not limited to age, sex/gender, race/ethnicity, location of residence, socioeconomic status, religion, marital status, ownership (home, car, pet, etc.), language, mobility, or life cycle (e.g., fertility, mortality, migration).

Such targeting information may also include spatial information, temporal information, social information and/or topical information. An example of spatial targeting information is an area, zone or geographic region in which the commercial incentive is to be distributed. An example of temporal targeting information is a time period during which the commercial incentive is to be distributed, a frequency of distribution, or a recurring temporal event such as a birthday or anniversary. An example of social targeting information is a target social group or network to which the commercial incentive is to be distributed. An example of topical targeting information includes an identification of subject matter to which the commercial incentive should be linked or associated. These examples are provided by way of illustration only, and are not intended to limit the present invention.

In an embodiment, CI manager 204 is also configured to allow an advertiser to provide information about a marketing campaign with which one or more commercial incentives are associated. The campaign information may include, for example, commercial goals associated with a campaign or commercial incentive parameters associated with the campaign. Depending upon the implementation, CI manager 204 may also be configured to provide tracking and/or analytics tools by which an advertiser may track the history of one or more commercial incentives or marketing campaigns.

In accordance with one embodiment of the present invention, CI manager 204 is also configured to receive business information from advertisers. Such business information may include transaction logs that indicate when a commercial incentive has been redeemed. These transaction logs may be used by CI engine 102 to perform or facilitate accounting functions, such as determining an amount of payment due to the operator of CI engine 102 as well as other distributor(s) of the commercial incentive upon redemption of the commercial incentive.

Furthermore, depending upon the implementation, business information that is provided by the advertiser may also be used by CI manager 204 to automatically modify terms associated with one or more existing commercial incentives that have already been distributed to consumers. For example, certain terms of a commercial incentive may be automatically modified responsive to business information provided from an advertiser such as inventory levels, gross receipts, number of on-site customers, or the like. Such business information may be periodically provided so that the information accurately reflects the business conditions in which the advertiser is currently operating. This automatic modification may also take into account campaign information associated with the commercial incentive, such as commercial goals and commercial incentive parameters.

4. Advertiser Data Database 214

Figure 4:
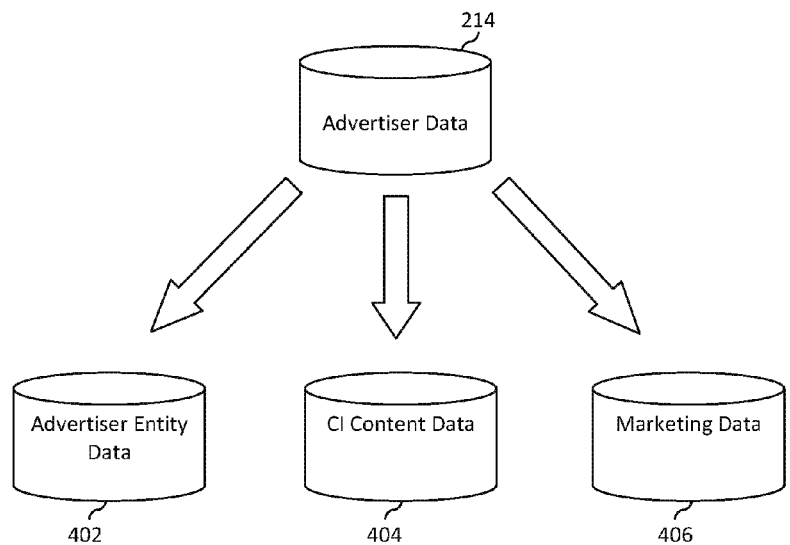
FIG. 4 illustrates different types of advertiser data that may be stored by a commercial incentive engine in accordance with an embodiment of the present invention.

As noted above, information provided by an advertiser through interaction with CI manager 204 is stored in advertiser data database 214. As shown in FIG. 4, advertiser data database 214 may include three types of data: advertiser entity data 402, CI content data 404, and marketing data 406.

Advertiser entity data 402 includes data about each advertiser that has registered to use CI engine 102 for the distribution of commercial incentives. Advertiser entity data 402 may include, for example, basic information such as organization name, address, city, state, zip code, country, telephone number, facsimile number, tax ID (SSN/EIN), tax classification, and/or VAT number. Furthermore, advertiser entity data 402 may also include information about a contact person, wherein such information may include the contact person's first and last name, title/function within the organization, telephone number and e-mail address.

Advertiser entity data 402 may also include transaction information concerning commercial incentives distributed or redeemed through CI engine 102. This transaction information may be used to facilitate payment to the owner of CI engine 102 in instances where payment for commercial incentive distribution is tied to the number of commercial incentives redeemed or to a value associated with each redeemed commercial incentive. Such transaction information may be tracked at one or more of the commercial incentive level, the campaign level, or the advertiser level.

Advertiser entity data 402 may further include periodically-updated business information provided by an advertiser, such as information relating to inventory levels, gross receipts, number of on-site customers, or the like. As noted above, CI manager 204 may use such information to automatically modify terms associated with one or more existing commercial incentives that have already been distributed to consumers.

CI content data 404 includes media content (e.g., copy) associated with a commercial incentive such as text, graphics, video or audio content associated with the commercial incentive including modular content components assembled at delivery time based upon user characteristics or data. CI content data 404 also includes terms associated with a commercial incentive, including but not limited to an identification of the product or service to which the commercial incentive relates, an incentive model, a discount amount, a rebate amount, a duration of an offer, or an identification of additional products or services to be delivered to a consumer upon redemption of the commercial incentive.

Marketing data 406 includes data concerning a marketing campaign with which one or more commercial incentives may be associated. Such campaign information may include, for example, commercial goals associated with a campaign or commercial incentive parameters associated with the campaign. Marketing data 406 may also include targeting information associated with one or more commercial incentives or with a campaign. As noted above, such targeting information may include but is not limited to an identification of a particular demographic to which the commercial incentive(s) are directed and may also include spatial information, temporal information, social information and/or topical information.

5. Distribution Manager 206

Distribution manager 206 is a component that is configured to receive valid commercial incentives created by an advertiser through interaction with CI manager 204 and to prepare such commercial incentives for distribution to consumers. Distribution manager 206 prepares the commercial incentives for distribution by populating them into an active CI graph 216 of commercial incentives that are immediately available for distribution to consumers. CI graph 216 comprises an abstract mathematical representation of all currently commercial incentives in a format that facilitates fast and efficient matching to consumers based on both targeting and other data associated with the commercial incentive and user data associated with the consumers. In one embodiment, CI graph 216 comprises a multi-dimensional graph wherein each dimension represents one variable upon which such matching may be performed.

Distribution manager 206 is also configured to track commercial incentives after they have been distributed from CI engine 102 to a consumer system/device. In one embodiment, such tracking is facilitated by assigning each commercial incentive a unique CI identifier (ID) upon distribution to a consumer, and mapping the unique CI ID to a unique consumer system/device. Distribution manager 206 is further configured to use such tracking functionality to update distributed commercial incentives that have been augmented by an advertiser via CI manager 204. All communication between distribution manager 206 and consumer systems/devices 112 for the purposes of tracking and updating distributed commercial incentives is carried out through communications manager 210.

In addition to publishing new commercial incentives into active CI graph 216 and updating augmented commercial incentives, distribution manager 206 is also configured to remove expired commercial incentives from the active CI graph 216, as well as from consumer systems/devices when appropriate.

In an embodiment, distribution manager 206 is also configured to receive and process information regarding the redemption of commercial incentives. This information concerning the redemption of commercial incentives may be provided to distribution manager 206 from a consumer system/device or network node in CI distribution network 104 (via communications manager 210) or may be provided by the advertiser that sponsored the incentive via CI manager 204 (e.g., in the form of transaction logs). Distribution manager 206 may use such information to facilitate payment of certain parties based on the redemption of a commercial incentive. In an alternate embodiment, this function is handled by a third party system that is external to CI engine 102.

6. Matching Manager 208

Matching manager 208 is a component that is configured to compare commercial incentives populated in active CI graph 216 with user data from database 212 for the purpose of selectively distributing commercial incentives to consumers. Matching manager 208 is configured to match commercial incentives to consumers by comparing targeting data and/or other information associated with the commercial incentives to user data associated with the consumers, wherein the user data may include spatial, temporal, social and/or topical data as described above. When matching manager 208 has determined that a commercial incentive is to be distributed to a particular consumer, it effects such distribution by sending the commercial incentive to communications manager 210 for transmission to a system/device associated with the consumer via CI distribution network 104.

Matching manager 208 may perform such matching responsive to the population of a new commercial incentive into active CI graph 216. Alternatively or additionally, matching manager 208 may perform such matching responsive to receiving a request from a consumer system/device or node within CI distribution network 104. Such request may be received via communications manager 210.

The manner in which matching manager 208 operates to effect targeted distribution of commercial incentives in accordance with an embodiment of the present invention will be described in more detail below.

7. Communications Manager 210

Communications manager 210 is a component that manages all communication between CI engine 102 and consumer systems/devices 112 and nodes residing on CI distribution network 104. Communications manager 210 is configured to perform, among other functions, the transmission of commercial incentives selected by matching manager 208 to consumer systems/devices 112 over CI distribution network 104. Communications manager 210 may also be further configured to communicate with consumer systems/ devices 112 over CI distribution network 104 for the purposes of tracking acceptance, lock-in, or redemption of commercial incentives and for the purposes of updating distributed commercial incentives. Depending upon the implementation, communications manager 210 may also be configured to interoperate with third party carriers and networks to effect communications.

B. Targeted Distribution of Commercial Incentives

Figure 5:
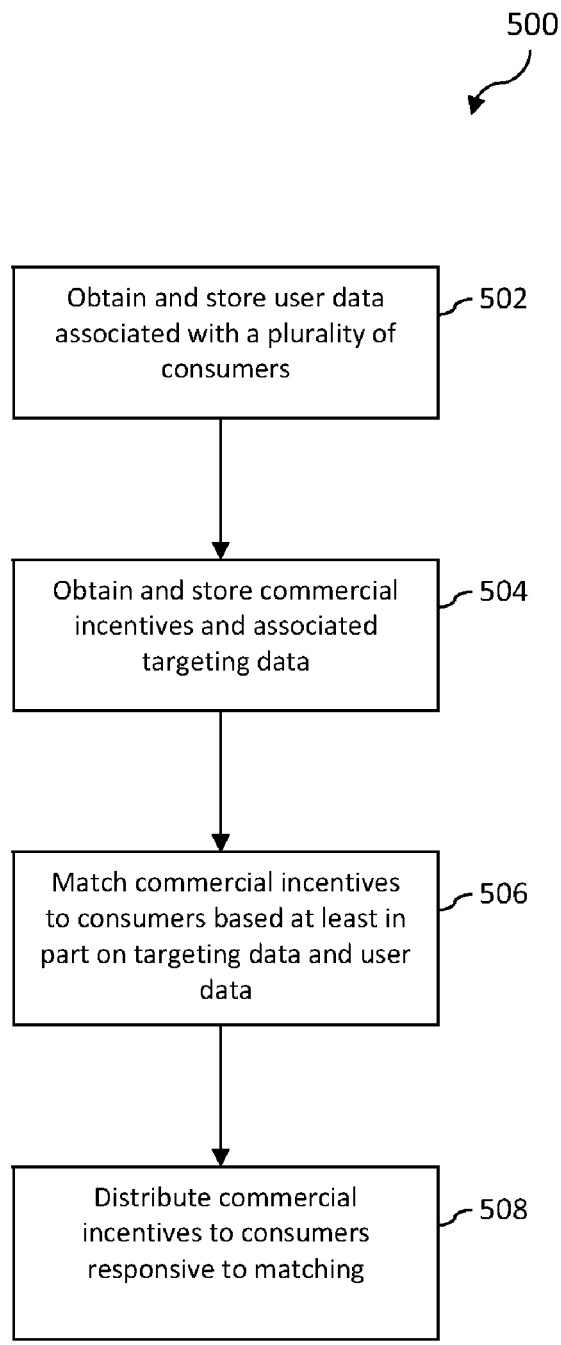
FIG. 5 depicts a flowchart of a method for performing targeted distribution of consumer incentives in accordance with an embodiment of the present invention.

FIG. 5 depicts a flowchart 500 of a method for performing targeted distribution of commercial incentives in accordance with an embodiment of the present invention. The steps of flowchart 500 will now be described with continued reference to exemplary commercial incentive engine 102 described above in reference to FIGS. 1 and 2, although the method is not limited to that implementation.

As shown in FIG. 5, the method of flowchart 500 begins at step 502, in which user data associated with a plurality of consumers is obtained and stored. As noted above, this user data may be actively provided by a consumer (such as via consumer interface 202), collected from consumer systems/devices 112 via CI distribution network 104 or some other channel, provided to CI engine 102 from some other network, system or database that aggregates such data, or by any combination of the foregoing. As further noted above, the user data stored may include spatial data, temporal data, social data and/or topical data associated with a consumer, as well as information deduced therefrom. Once obtained, the user data is stored in user data database 212.

At step 504, commercial incentives and targeting data associated therewith are obtained and stored. As described above, an advertiser may create or provide a commercial incentive through interaction with CI manager 204. The advertiser may also provide targeting data associated with the commercial incentive via CI manager 204. Alternatively or additionally, CI manager 204 may automatically infer targeting data for the commercial incentive based on the source, content and/or terms associated with the commercial incentive. The commercial incentive and targeting data associated therewith is stored in advertiser data database 214. When the commercial incentive is ready for distribution, distribution manager 206 populates the commercial incentive into active CI graph 216 of commercial incentives ready for distribution. The manner in which the commercial incentive is populated into CI graph 216 may depend upon the targeting data associated with the commercial incentive.

At step 506, the commercial incentives ready for distribution are matched to consumers based at least in part on the targeting data associated with the consumer incentives and user data associated with the consumers. In commercial incentive engine 102, this function is performed by matching manager 208. To perform this function, matching manager 208 matches commercial incentives represented in active CI graph 216 with user data obtained from user data database 212. At step 508, commercial incentives that have been matched to consumers are transmitted to the selected consumers over CI distribution network 104. In commercial incentive engine 102, this transmission is managed by communications manager 210.

The ability to match commercial incentives with consumers based on targeting data associated with the commercial incentive and user data associated with consumers in the manner described above advantageously allows for highly-targeted delivery of commercial incentives to the consumers that are most likely to use them. Because both the targeting data and the user data may include spatial, temporal, social and topical data, matching may be performed based on any or all of these data types, as well as based on any combination of these data types.

For example, in one implementation, the user data includes spatial data corresponding to the current location of a consumer and the targeting data associated with the commercial incentive specifies a target area within which the commercial incentive is to be delivered. If the current location of the consumer is within the target area, then matching manager 208 will match the commercial incentive to the consumer and the commercial incentive will be transmitted to the consumer by communications manager 210. Such an implementation may be used, for example, to provide commercial incentives to consumers when they are within close proximity of a business, product, service, activity or attraction to which the commercial incentive applies or to which the commercial incentive is otherwise related. Such an implementation can be used, for example, to deliver commercial incentives to consumers when they are physically located in an area in which it is convenient to redeem the incentive.

As another example, in one implementation, the user data includes temporal data corresponding to the consumer and the targeting data associated with the commercial incentive specifies a target time period associated with the commercial incentive. If the temporal data falls within the target time period, then matching manager 208 will match the commercial incentive to the consumer and the commercial incentive will be transmitted to the consumer by communications manager 210. Such an implementation may be used, for example, to provide commercial incentives to consumers at times when they are most likely to purchase a particular product or service or to participate in a certain activity or attraction (e.g., a commercial incentive for a restaurant may be delivered during a time period when a user typically eats or is scheduled to eat lunch). Such an implementation may also be used, for example, to deliver commercial incentives to consumers in recognition of certain temporal events associated with a consumer (e.g., a commercial incentive delivered on a consumer's birthday).

As a further example, in one implementation, the user data includes social data, wherein the social data includes an identification of a plurality of users with whom the consumer is socially connected, and the targeting data includes an identification of other users that have received the commercial incentive. If at least one of the users that have received the commercial incentive is within the plurality of users with whom the consumer is socially connected, then matching manager 208 will match the commercial incentive to the consumer and the commercial incentive will be transmitted to the consumer by communications manager 210. Such an implementation allows commercial incentives to be propagated within social networks, and to spread among interconnected social networks. Commercial incentives distributed in such a manner carry an implicit social endorsement with them which may make them of more interest to a consumer than if the incentives had been received via some other channel. As will be appreciated by persons skilled in the relevant art(s), such distribution within and among social networks can be limited or weighted by other factors, such as but not limited to interest, activity, intimacy, proximity, relatedness and willingness to share.

As a still further example, in one implementation, the user data includes topical data indicating an area of interest to the consumer. The area of interest may be determined by any of a wide variety of variables and interactions associated with the consumer which have been discussed in detail above. If matching manager 208 determines, based on the explicit or inferred targeting data, that a commercial incentive is related to the area of interest of the consumer, then matching manager 208 will match the commercial incentive to the consumer and the commercial incentive will be transmitted to the consumer by communications manager 210. This implementation can be used to deliver commercial incentives to consumers that relate to the products, services, activities and attractions that the consumer has demonstrated an interest in.

In accordance with an embodiment of the present invention, matching of commercial incentives to consumers may be performed using any combination of spatial, temporal, social and topical user/targeting data, thereby allowing commercial incentives to be delivered to consumers in highly targeted fashion. The use of a wide variety of variables, including real-time information concerning the location of a user in spatial, temporal and social spaces, allows for extremely granular and precise matching, as well as a personalized user experience.

Figure 6:
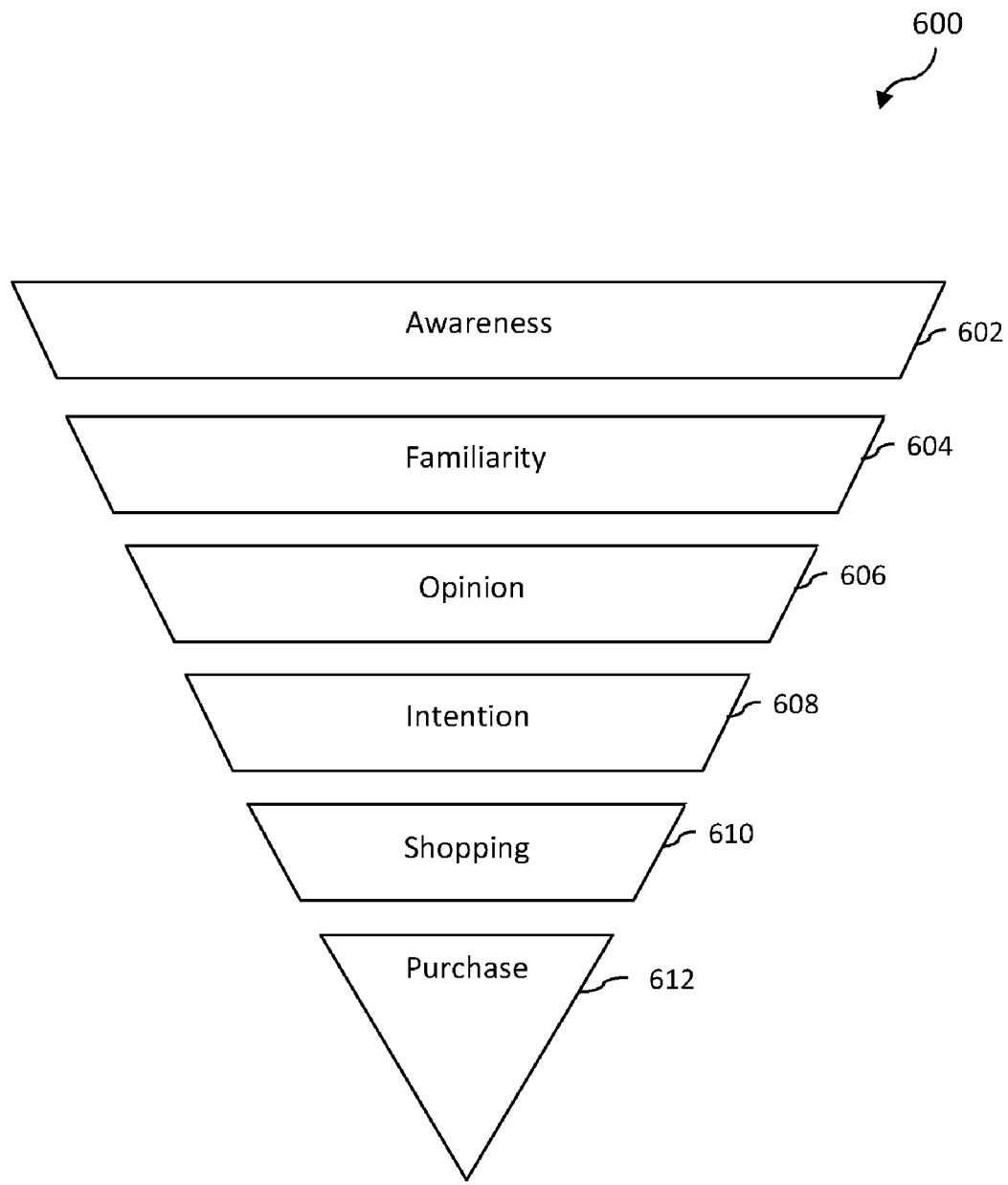
FIG. 6 is a diagram of various stages that a consumer may pass through between first becoming aware of a product or service through actually purchasing the product or service.

To illustrate this, FIG. 6 depicts a diagram 600 of various stages that a consumer may pass through between first becoming aware of a product or service through actually purchasing the product or service. These stages are sometimes referred to by marketers as the "purchase funnel." As shown in FIG. 6, the stages include awareness 602, familiarity 604, opinion 606, intention 608, shopping 610 and purchase 612.

An embodiment of the present invention allows consumers to be identified that are within a particular stage of the purchase funnel with respect to a particular product/service and then to deliver targeted commercial incentives to those consumers. Consumers at different stages of the funnel can be targeted depending upon the desires of the advertiser. Also, an advertiser may provide different incentives to consumers that are located within different stages of the purchase funnel depending on a marketing strategy.

Thus, for example, if the advertiser is an automobile dealership, user data associated with a consumer may reveal that the consumer has been downloading advertising content relating to cars that are sold at the dealership, that the user has applied for a car loan, and that the user is currently driving in the neighborhood of the dealership. Conceptually speaking, the consumer can be said to have progressed to a later stage within the purchase funnel. In this case, the commercial incentive engine can identify such a consumer as an extremely valuable lead and target commercial incentives relating to the cars sold at the dealership to the consumer. Thus, a commercial incentive engine in accordance with an embodiment of the present invention advantageously provides an advertiser with the ability to identify such valuable leads in an evolving and dynamic manner and to deliver commercial incentives to those leads at a time when it is most likely to influence purchasing decisions and/or most convenient for the consumer to make a purchase.

Although an implementation of the present invention may use any combination of social, spatial, temporal and topical data to perform targeted distribution of commercial incentives, by examining the intersection of all four types of data, patterns of consumer behavior may be revealed that can be used to enhance both targeting of a consumer in a particular stages of the purchase funnel as well as providing more useful commercial incentive service to the consumer by a network operator.

C. Dynamic Augmentation of Commercial Incentives

Figure 7:
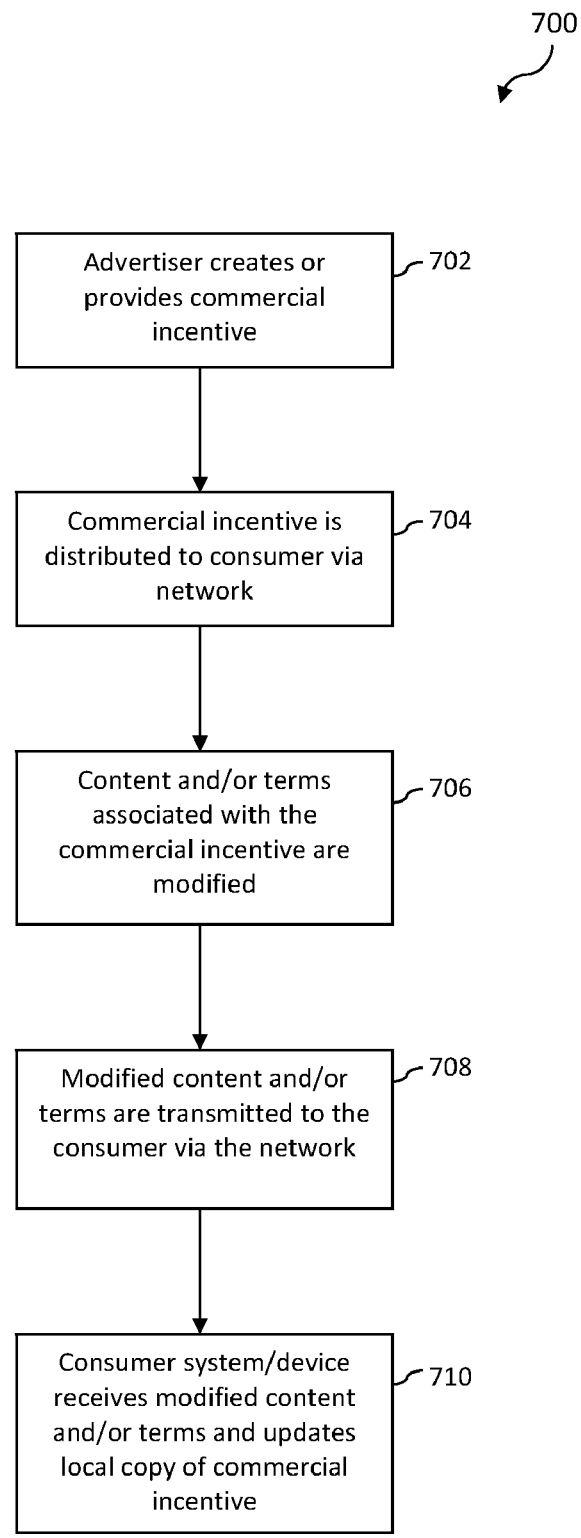
FIG. 7 depicts a flowchart of a method for dynamically augmenting a commercial incentive in accordance with an embodiment of the present invention.

FIG. 7 depicts a flowchart 700 of a method for dynamically augmenting a commercial incentive in accordance with an embodiment of the present invention. The steps of flowchart 700 will now be described with continued reference to exemplary commercial incentive engine 102 described above in reference to FIGS. 1 and 2, although the method is not limited to that implementation.

As shown in FIG. 7, the method of flowchart 700 begins at step 702, in which an advertiser creates or provides a commercial incentive. As described above, an advertiser may create or provide a commercial incentive through interaction with CI manager 204. The commercial incentive, and any targeting data associated therewith, is stored in advertiser data database 214. When the commercial incentive is ready for distribution, distribution manager 206 populates the commercial incentive into active CI graph 216 of commercial incentives ready for distribution.

At step 704, the commercial incentive created or provided in step 702 is distributed to a consumer via a network. As described above, in commercial incentive engine 102, this step may occur responsive to the matching of the commercial incentive to the consumer by matching manager 208. The actual transmission of the commercial incentive from commercial incentive engine 102 to the consumer is managed by communications manager 210 and takes place over CI distribution network 104.

At step 706, content and/or terms associated with the commercial incentive are modified. Modifying content associated with the commercial incentive may include, but is not limited to, modifying media content such as text, graphics, video or audio content associated with the commercial incentive. Modifying terms associated with the content may include, but is not limited to, modifying an identification of the product or service to which the commercial incentive relates, an incentive model, a discount amount (expressed in terms of an amount of money or percentage of a price), a rebate amount, duration of an offer, or an identification of additional products or services to be delivered to a consumer upon redemption of the commercial incentive.

In commercial incentive engine 102, CI manager 204 is responsible for modifying the content and/or terms of the commercial incentive. CI manager 204 may perform this function responsive to revisions to the content and/or terms input by advertisers 110 via an interface to CI manager 204. To this end, CI manager 204 may include interface tools for easily allowing an advertiser to revise the content and/or terms associated with an existing commercial incentive or to manage multiple versions of commercial incentive copy.

Alternatively or additionally, CI manager 204 may modify the content and/or terms of the commercial incentive responsive to business information provided by advertisers 110 via an interface to CI manager 204. For example, CI manager 204 may modify the content and/or terms of the commercial incentive responsive to information such as inventory levels, gross receipts, number of on-site customers, or the like. Such business information may be periodically provided so that the information accurately reflects the business conditions in which the advertiser is currently operating. CI manager 204 may also take into account campaign information associated with the commercial incentive, such as commercial goals and commercial incentive parameters, when performing the modification.

At step 708, the modified content and/or terms associated with the commercial incentive are transmitted to the consumer via the network. In commercial incentive engine 102, this function is performed by distribution manager 206, which invokes communications manager 210 to transmit the modified content and/or terms to the consumer via CI distribution network 104. At step 710, the consumer system/device receives the modifications and updates a local copy of the commercial incentive accordingly. In one embodiment, only modified aspects of the commercial incentive are transmitted to the consumer system/device, while in an alternative embodiment an entirely new commercial incentive that includes the modified aspects is transmitted to the consumer/system device.

The ability of an advertiser to modify the terms of a commercial incentive responsive to changing business conditions (either by directly changing the terms or by electing that such terms be modified automatically in response to current business information as described above) presents a distinct advantage over conventional commercial incentive distribution and redemption practices. Conventional commercial incentives have terms that must remain fixed so long as the incentive is valid. In contrast, an embodiment of the present invention allows an advertiser to, for example, increase the value of a commercial incentive during slow times and then decrease it again during good times. As another example, an embodiment of the present invention allows an advertiser to alter the value of the commercial incentive responsive to whether or not certain campaign goals are being met over time, in effect allowing an advertiser to increase or decrease the value of the incentive for all or a select set of targeted consumers.

Other dynamic augmentations strategies and approaches may be used. For example, to attract business during slow times an advertiser may designate a certain night a "2× coupon" night and during that time period double the value of certain commercial incentives. In contrast, during good times, an advertiser may designate a certain night a "no coupon night," and not honor any commercial incentives during that time period. As another example, to attract business, an advertiser may elect to honor commercial incentives published by a competitor (this may be thought of as changing the terms associated with the competitor's commercial incentives). However, these examples are not intended to be limiting and persons skilled in the relevant art(s) will readily appreciate that other methods for changing the terms a commercial incentive to respond to changing business conditions are encompassed by the present invention.

Figure 8:
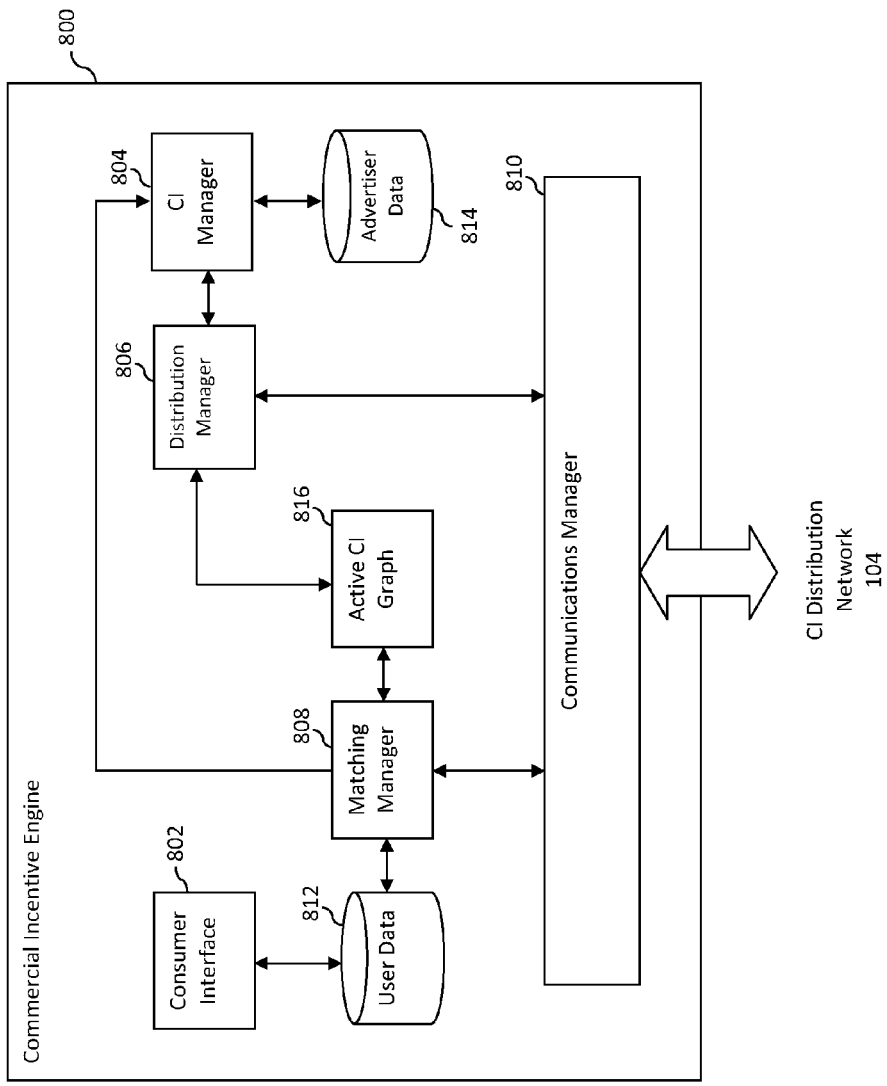
FIG. 8 is a block diagram of a commercial incentive engine in accordance with an alternate embodiment of the present invention that facilitates dynamic determination of content and/or terms of commercial incentives.

FIG. 8 is a block diagram of a commercial incentive engine 800 in accordance with an alternate embodiment of the present invention. This alternate embodiment allows the content and/or terms associated with a commercial incentive to be dynamically determined prior to distribution. The content and/or terms may be automatically determined based on user data associated with the consumer to whom the incentive is to be distributed.

As shown in FIG. 8, commercial incentive engine 800 includes a number of communicatively-connected elements including a consumer interface 802, a CI manager 804, a distribution manager 806, a matching manager 808, a communications manager 810, a user data database 812, an advertiser data database 814, and an active CI graph 816. With the exception of certain functions to be described immediately below, each of these elements performs essentially the same functions as described above in reference to like-named elements of commercial incentive engine 102.

Figure 9:
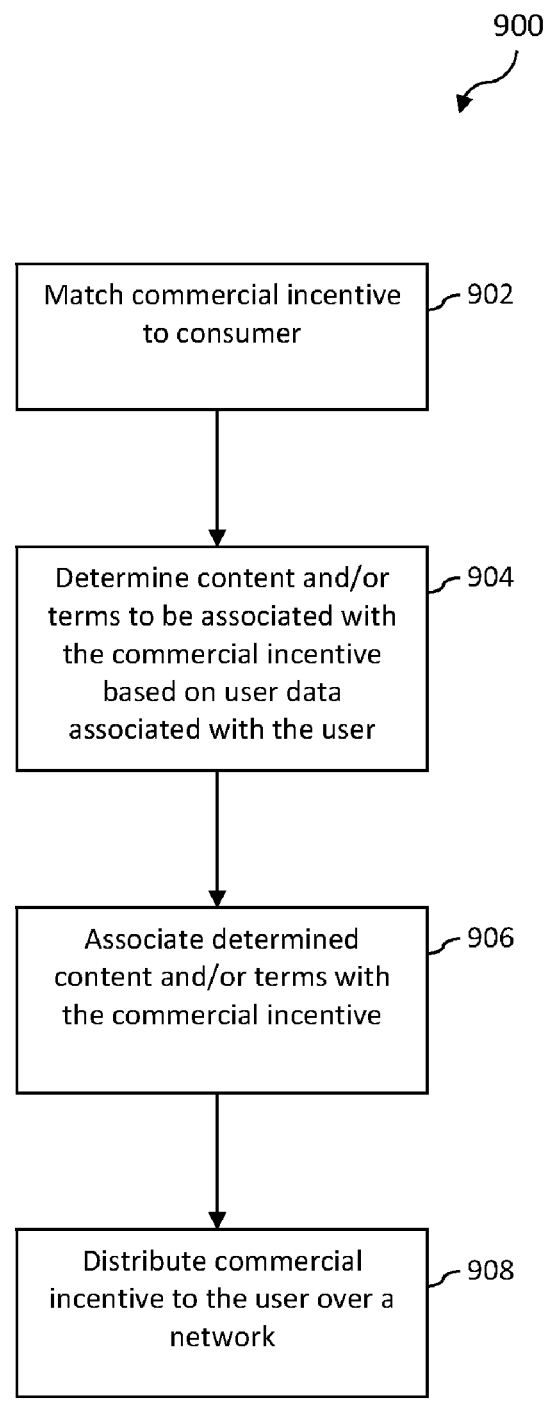
FIG. 9 depicts a flowchart of a method for dynamically determining content and/or terms to be associated with a commercial incentive prior to distribution to a consumer in accordance with an embodiment of the present invention.

The manner in which commercial incentive engine 800 operates to dynamically determine content and/or terms to be associated with a commercial incentive prior to distribution to a consumer will now be described in reference to flowchart 900 of FIG. 9.

At step 902, matching manager 808 matches a commercial incentive to a consumer based on user data associated with the consumer and on targeting data associated with the commercial incentive in a manner previously-described. After performing this matching function, matching manager 808 further conveys the user data associated with the consumer, or a portion thereof, to CI manager 804.

At step 904, CI manager 804 determines the content and/or terms to be associated with the commercial incentive based at least in part on the user data conveyed from matching manager 808. The content and/or terms may also be determined based on business information and/or campaign goals provided by an advertiser.

At step 906, CI manager 804 associates the determined content and/or terms with the commercial incentive.

At step 908, distribution manager 806 distributes the commercial incentive to the consumer over CI distribution network 104. To perform this function, distribution manager 806 invokes communications manager 810.

The foregoing implementation is advantageous because it allows an advertiser to uniquely adapt the content and/or terms of a commercial incentive to the consumer that is going to receive it. By using spatial, temporal, social and topical data associated with a consumer, an incentive can be crafted in a manner that will generate the greatest amount of interest by the consumer. Thus, commercial incentives may be fully personalized. By way of example, the content of a commercial incentive may be selected to conform to the aesthetic preferences of the consumer. As another example, the terms of the commercial incentive may be varied responsive to the level of interest the consumer has demonstrated in a particular product or service (e.g., increasing the value of the incentive for consumers that have not shown an interest to pull them into the purchase funnel) or responsive to the physical proximity of the consumer to a business, product, service, activity or attraction to which the commercial incentive applies (e.g., offering additional value to consumers very close to a retail store to compel them to enter the store). As another example, a commercial incentive may be modified to include an endorsement from another consumer.

In an alternate embodiment of the present invention, the dynamic modification of a commercial incentive that has already been distributed to a consumer (as described above in reference to flowchart 700 of FIG. 7) may also take into account user data associated with the consumer. This allows the incentive to be modified in a manner that is responsive to dynamically-changing factors associated with a consumer, such as location, areas of interest, social networks, and the like. By way of example, an advertiser interested in attracting immediate business may use such an embodiment to increase the value of commercial incentives carried by consumers that are currently most likely to use them as determined based on user data. Such consumers may include, for example, consumers that are physically closest to the advertiser's place of business.

Consumers may not be enamored of a system in which the value of a commercial incentive resident on the consumer system/device can be dynamically reduced, or in which a commercial incentive can be dynamically terminated or expired by an advertiser. To address this, an embodiment of the present invention allows a consumer to "lock in" the value or terms of a commercial incentive resident on the consumer system or device for a certain period of time in order to register an intention to use it. Distribution manager 206 of commercial incentive engine 102 may be configured to track whether or not a distributed commercial incentive has been locked in by a consumer. When a distributed commercial incentive has been locked in, distribution manager 206 ensures that the locked in terms of the distributed commercial incentive are not altered and that the lock-in expires when the lock-in period is over.

D. Redistribution of Commercial Incentives among Consumers

In accordance with an embodiment of the present invention, commercial incentives received by a consumer device may be redistributed to other consumer devices, thereby facilitating the sharing and/or transport of commercial incentives between and among consumers. Redistribution of a commercial incentive involves the transmission of a unique and redeemable copy of a commercial incentive from a first consumer device to a second consumer device. As will be discussed in more detail below, this redistribution may occur when two or more consumers carrying properly-configured devices find themselves within the same proximity network or within the same social network.

Figure 10:
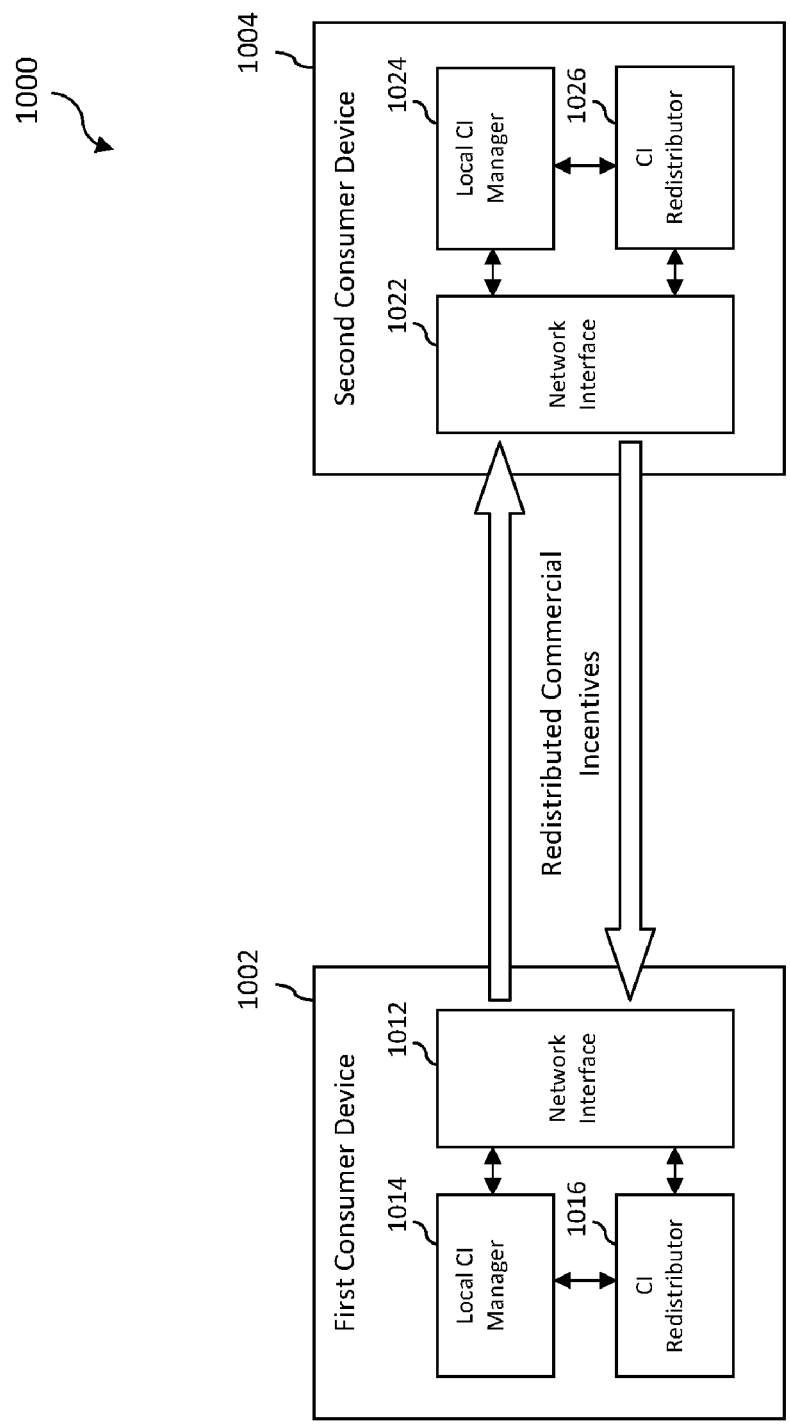
FIG. 10 depicts an exemplary system that facilitates the redistribution of commercial incentives between consumer devices in accordance with an embodiment of the present invention.

FIG. 10 depicts an exemplary system 1000 that facilitates the redistribution of commercial incentives between consumer devices in accordance with an embodiment of the present invention. As shown in FIG. 10, system 1000 includes a first consumer device 1002 and a second consumer device 1004. First and second consumer devices 1002 and 1004 may each comprise any type of processor-based user device, including but not limited to a laptop computer, cellular phone, personal digital assistant, portable media player, or the like. For the purposes of commercial incentive redistribution within proximity networks, it is preferable that at least one or both of first consumer device 1002 and second consumer device 1004 is a mobile or portable device, although the invention is not so limited.

First consumer device 1002 includes a number of communicatively-connected components, including a network interface 1012, a local CI manager 1014, and a CI redistributor 1016. Network interface 1012 is configured to allow first consumer device 1002 to communicate with other entities over a network, wherein such communication may include the sending or receiving of commercial incentives as described in more detail herein. Local CI manager 1014 is configured to store received commercial incentives and to present a user interface (such as a graphical user interface) to a user of first consumer device 1002. The user interface allows the user to manage received commercial incentives, wherein managing the received commercial incentives may include performing a variety of functions, such as viewing, organizing, locking-in, deleting, printing, redistributing or redeeming received commercial incentives. CI redistributor 1016 is configured to redistribute a commercial incentive stored by local CI manager 1014 to one or more other consumer devices via network interface 1012. Depending upon the implementation, such redistribution may occur automatically or responsive to a user command entered via a user interface associated with local CI manager 1014.

Second consumer device 1004 also includes a number of communicatively-connected components, including a network interface 1022, a local CI manager 1024, and a CI redistributor 1026. These components perform similar functions to network interface 1012, local CI manager 1014, and CI redistributor 1016, respectively, as described above in reference to first consumer device 1002. However, these components may be configured differently if second consumer device 1004 is a different type of consumer device than first consumer device 1002. Also, it should be noted that to perform redistribution of commercial incentives, only one of first and second consumer devices 1002 and 1004 needs to include a CI redistributor component. Thus, in one implementation, some consumer devices are capable of receiving commercial incentives only while other consumer devices are capable of both receiving and redistributing commercial incentives.

As further shown in FIG. 10, a commercial incentive may be transmitted from network interface 1012 of first consumer device 1002 to network interface 1022 of second consumer device 1004 or from network interface 1022 of second consumer device 1004 to network interface 1012 of first consumer device 1002. Various scenarios in which such transmission may occur will now be described.

Figure 11:
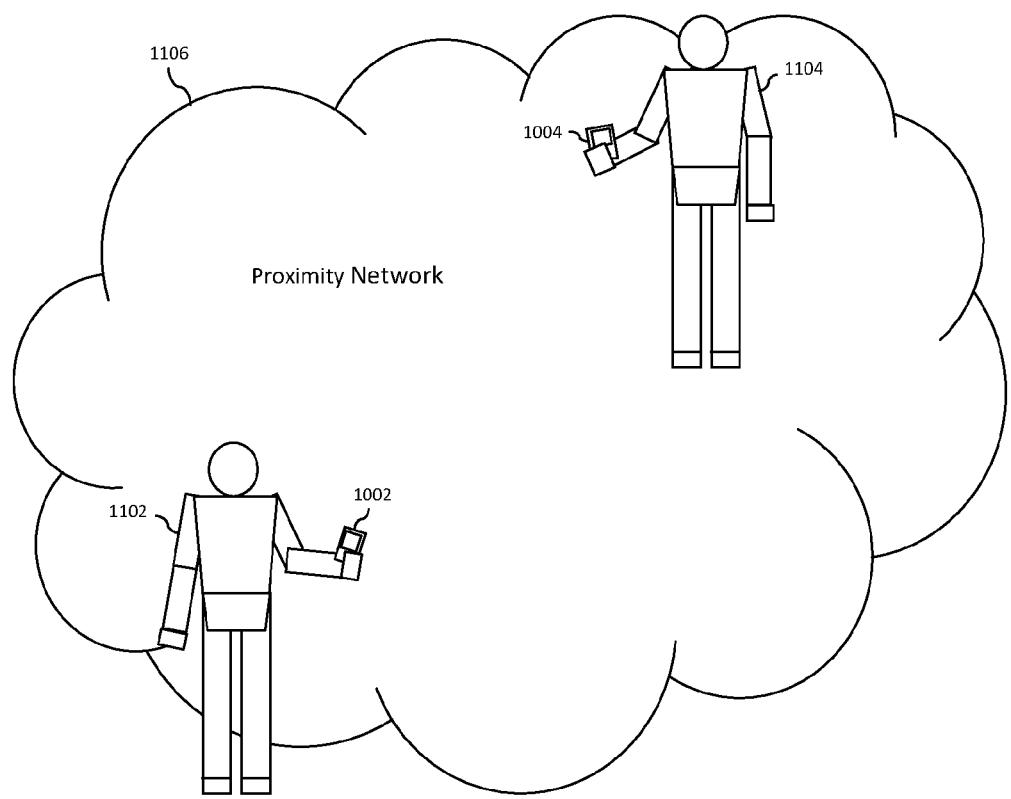
FIG. 11 is a diagram showing first and second consumers carrying respective first and second consumer devices, wherein the first and second consumer devices are each communicatively connected to the other via a proximity network.

In an embodiment of the present invention, redistribution of a commercial incentive from a first consumer device to a second consumer device may occur when both devices are in the same proximity network. This scenario is illustrated in FIG. 11, which shows a first consumer 1102 carrying first consumer device 1002 and a second consumer 1104 carrying second consumer device 1004, wherein the first and second consumer devices 1002 and 1004 are each communicatively connected to the other via a proximity network 1106. As used herein, the term proximity network refers to a wireless connection that exists between one or more consumer devices by virtue of the proximity of those devices to each other or to one or more common network nodes. Communication between the consumer devices may be peer-to-peer communication or communication via the network node(s). Examples of proximity networks include but are not limited to an 802.11 wireless local area network (WLAN) or a Bluetooth piconet or scatternet.

Figure 12:
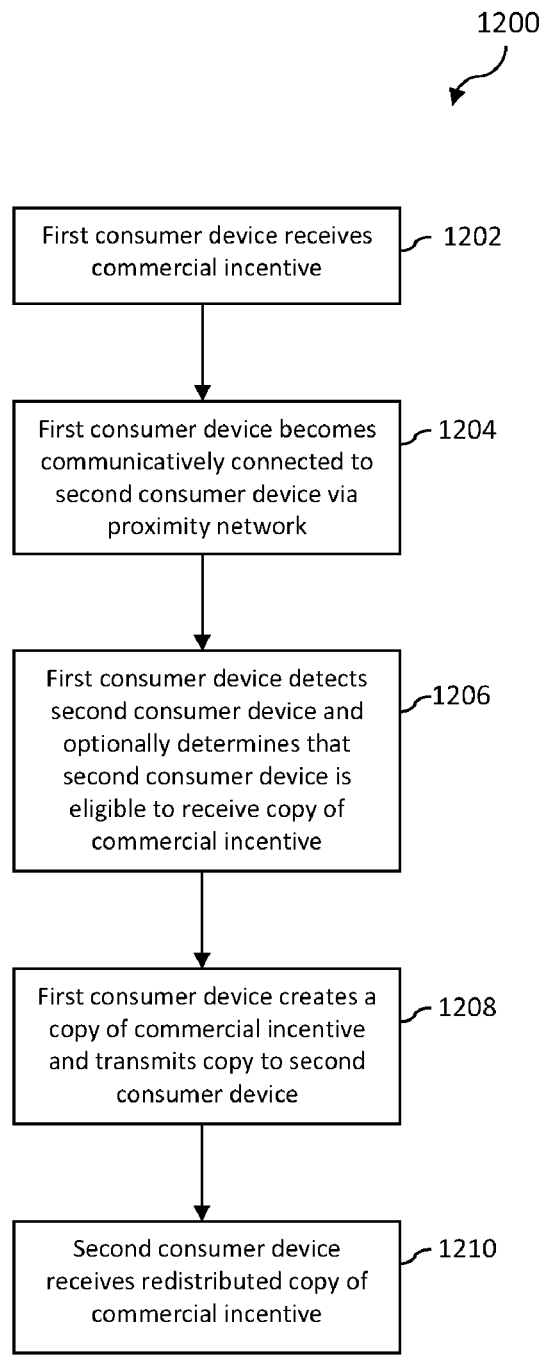
FIG. 12 depicts a flowchart of a method for redistributing a commercial incentive from a first consumer device to a second consumer device via a proximity network in accordance with an embodiment of the present invention.

FIG. 12 depicts a flowchart 1200 of a method for redistributing a commercial incentive from a first consumer device to a second consumer device via a proximity network in accordance with an embodiment of the present invention. For the sake of illustration, the method of flowchart 1200 will be described with continued reference to elements of system 1000 of FIG. 10, although the method is not limited to that particular implementation.

As shown in FIG. 12, the method of flowchart 1200 begins at step 1202, in which first consumer device 1002 receives a commercial incentive. The commercial incentive may be received from a commercial incentive engine, such as commercial incentive engine 102, or from another consumer device. The commercial incentive may be received via network interface 1012 or some other network interface of consumer device 1002. Responsive to the receipt of the commercial incentive, local CI manager 1014 stores the commercial incentive within first consumer device 1002.

At step 1204, first consumer device 1002 becomes communicatively connected to second consumer device 1004 via proximity network 1106. This step may occur, for example, when first and second consumers 1102 and 1104 carry consumer devices 1002 and 1004, respectively, within a certain proximity of each other or a common wireless access point.

At step 1206, CI redistributor 1002 within first consumer device 1002 detects the presence of second consumer device 1004 on proximity network 1106 and optionally determines that second consumer device 1004 is eligible to receive a redistributed copy of the commercial incentive received in step 1202. Determining that second consumer device 1004 is eligible to receive a copy of the commercial incentive may entail communicating with second consumer device 1004 or another entity (e.g., commercial incentive engine 102) to obtain eligibility information associated with second consumer 1104. Such eligibility information may include but is not limited to configuration and/or preference data explicitly provided by second consumer 1104 or information derived from user data associated with second consumer 1104.

At step 1208, responsive to detecting the presence of second consumer device 1004 on proximity network 1106 and optionally determining that second consumer device 1004 is eligible to receive a redistributed copy of the commercial incentive received in step 1202, CI redistributor 1016 within first consumer device 1002 creates a copy of the commercial incentive and transmits the copy to second consumer device 1004 via network interface 1012. During or subsequent to this step, CI redistributor 1016 may also communicate with a distribution manager within a commercial incentive engine (such as distribution manager 206 within commercial incentive engine 102) to notify the distribution manager that the redistribution has occurred, so that the distribution manager can track the newly-created and redistributed copy of the commercial incentive.

At step 1210, second consumer device 1004 receives the redistributed copy of the commercial incentive via network interface 1022. Responsive to the receipt of the redistributed copy of the commercial incentive, local CI manager 1024 stores the commercial incentive within second consumer device 1004. During or subsequent to this step, local CI manager 1024 may also communicate with a distribution manager within a commercial incentive engine (such as distribution manager 206 within commercial incentive engine 102) to notify the distribution manager of the receipt of the redistributed commercial incentive, so that the distribution manager can track the newly-created and redistributed copy of the commercial incentive and update user records.

In an embodiment of the present invention, redistribution of a commercial incentive from a first consumer device to a second consumer device may also occur when the consumers carrying the devices are within the same social network. Such redistributed commercial incentives may be considered "socially endorsed" since they originate from persons within a consumer's social network.

Figure 13:
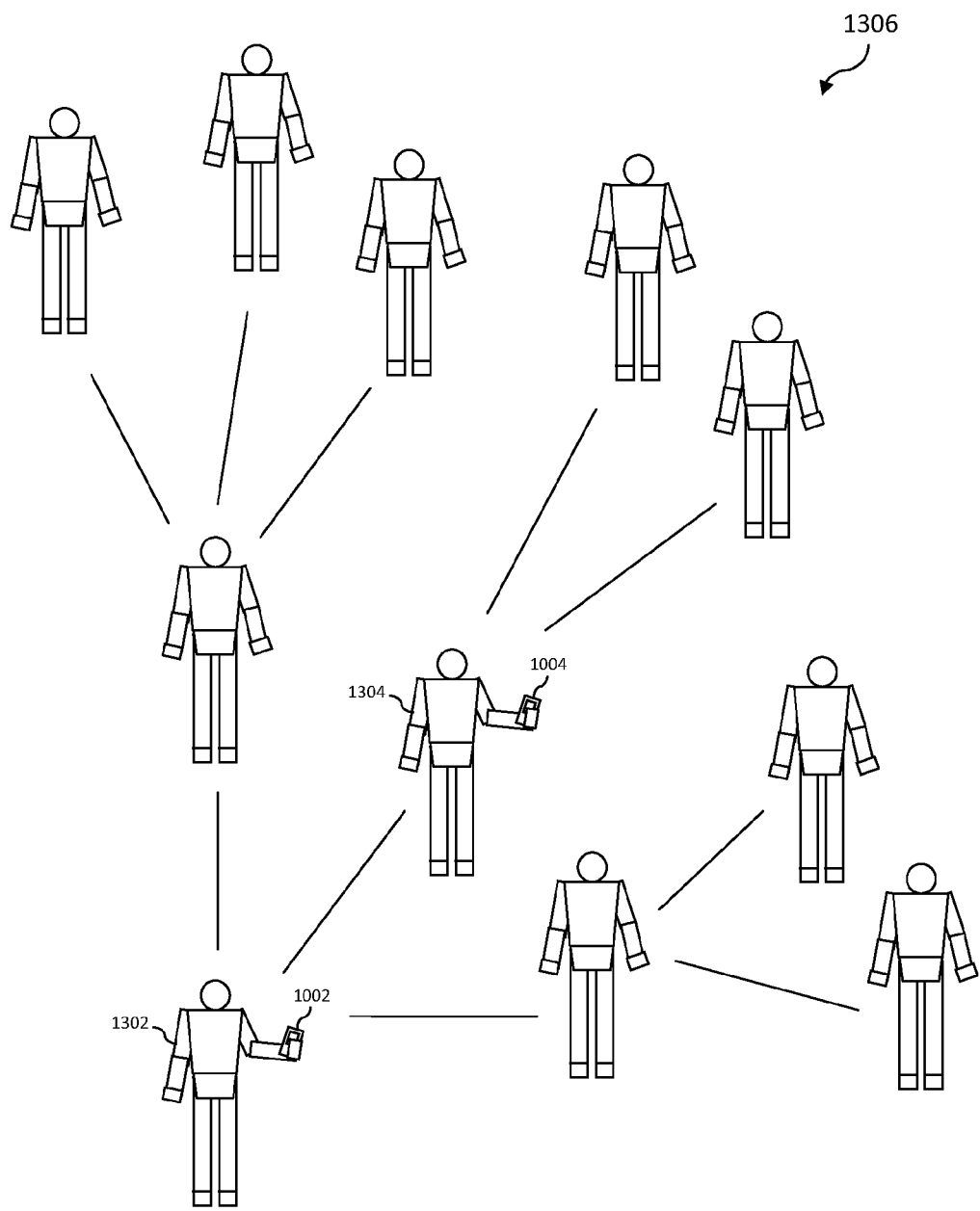
FIG. 13 is a diagram showing first and second consumers carrying respective first and second consumer devices, wherein the first and second consumers are connected via a social network associated with the first consumer.

This scenario is illustrated in FIG. 13, which shows a first consumer 1302 carrying first consumer device 1002 and a second consumer 1304 carrying second consumer device 1004, wherein the first and second consumers 1302 and 1304 are connected via a social network 1306 associated with first consumer 1302. Note that although second consumer 1304 is shown as being directly connected to first consumer 1302 within social network 1306, in accordance with an embodiment of the present invention, redistribution of a commercial incentive may occur from first consumer 1302 to any or all of the consumers within social network 1306, even when the connection with first consumer 1302 is indirect. Stated another way, second consumer 1304 may be any of the consumers within social network 1306, regardless of the degree of separation from first consumer 1302. Furthermore, second consumer 1304 may even be added to social network 1306 by virtue of the act of commercial incentive distribution.

Figure 14:
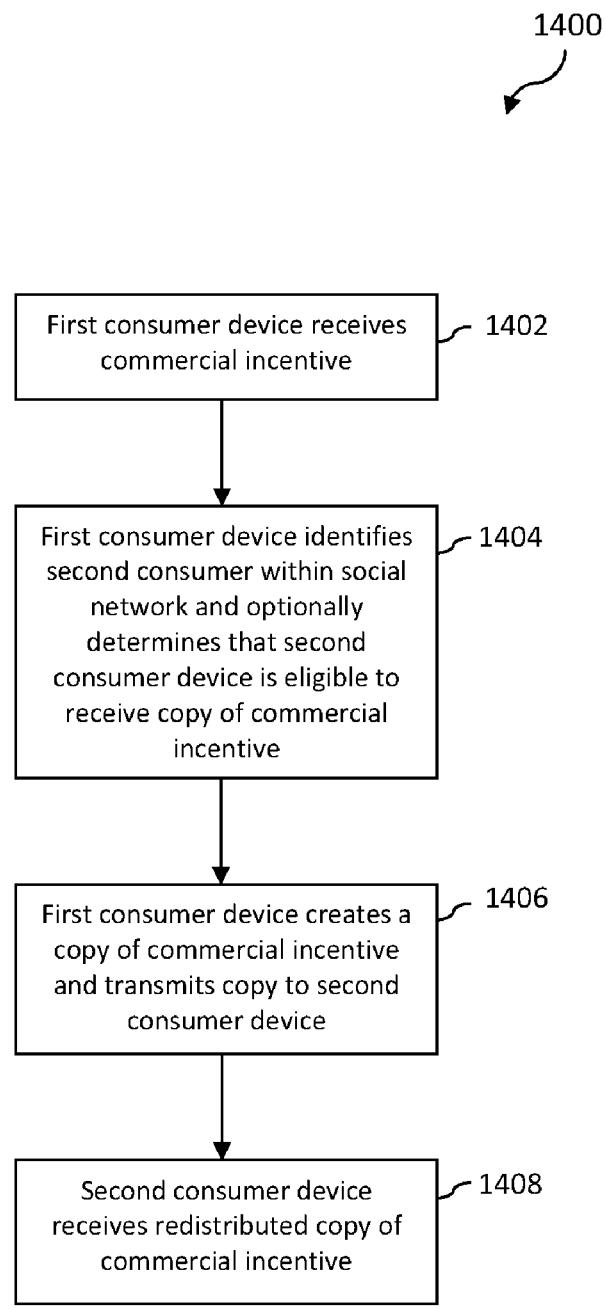
FIG. 14 depicts a flowchart of a method for redistributing a commercial incentive from a first consumer to a second consumer within a social network in accordance with an embodiment of the present invention.

FIG. 14 depicts a flowchart 1400 of a method for redistributing a commercial incentive from a first consumer to a second consumer within a social network in accordance with an embodiment of the present invention. For the sake of illustration, the method of flowchart 1400 will be described with continued reference to elements of system 1000 of FIG. 10, although the method is not limited to that particular implementation.

As shown in FIG. 14, the method of flowchart 1400 begins at step 1402, in which first consumer device 1002 receives a commercial incentive. The commercial incentive may be received from a commercial incentive engine, such as commercial incentive engine 102, or from another consumer device. The commercial incentive may be received via network interface 1012 or some other network interface of consumer device 1002. Responsive to the receipt of the commercial incentive, local CI manager 1014 stores the commercial incentive within first consumer device 1002.

At step 1404, CI redistributor 1016 within first consumer device 1002 identifies one or more consumers within a social network of first consumer 1302, wherein the one or more consumers includes second consumer 1304. This identification may involve accessing locally-stored or remotely-stored data relating to a social network associated with first consumer 1302. The remotely-stored data may include user data associated with first consumer 1302 that is stored in a commercial incentive engine (such as commercial incentive engine 102).

Step 1404 may optionally include determining that second consumer 1304 is eligible to receive a redistributed copy of the commercial incentive received in step 1402. Determining that second consumer 1304 is eligible to receive at least one redistributed commercial incentive may entail communicating with second consumer device 1004 or another entity (e.g., commercial incentive engine 102) to obtain eligibility information associated with second consumer 1304. Such eligibility information may include but is not limited to configuration and/or preference data explicitly provided by second consumer 1304 or information derived from user data associated with second consumer 1304.

At step 1406, responsive to identifying second consumer 1304 and optionally determining that second consumer 1304 is eligible to receive a redistributed copy of the commercial incentive received in step 1402, CI redistributor 1016 within first consumer device 1002 creates a copy of the commercial incentive and transmits the copy to second consumer device 1004 via network interface 1012. During or subsequent to this step, CI redistributor 1016 may also communicate with a distribution manager within a commercial incentive engine (such as distribution manager 206 within commercial incentive engine 102) to notify the distribution manager that the redistribution has occurred, so that the distribution manager can track the newly-created and redistributed copy of the commercial incentive and update user records.

At step 1408, second consumer device 1004 receives the redistributed copy of the commercial incentive via network interface 1022. Responsive to the receipt of the redistributed copy of the commercial incentive, local CI manager 1024 stores the commercial incentive within second consumer device 1004. During or subsequent to this step, local CI manager 1024 may also communicate with a distribution manager within a commercial incentive engine (such as distribution manager 206 within commercial incentive engine 102) to notify the distribution manager of the receipt of the redistributed commercial incentive, so that the distribution manager can track the newly-created and redistributed copy of the commercial incentive and update user records.

Note that in the method of flowchart 1400, redistribution of the commercial incentive from first consumer device 1002 to second consumer device 1004 need not occur over a proximity network, but can occur over any type of network or combination of networks including wide area networks, local area networks, private networks, public networks, packet networks, circuit-switched networks, and wired or wireless networks.

As noted above, in one implementation, redistribution of a commercial incentive will only occur responsive to a user command entered via a user interface associated with local CI manager 1014. However, in an alternate implementation, redistribution may occur automatically from one consumer device to another based on temporal and/or social network connections. Such an implementation can be used to facilitate "viral" redistribution of commercial incentives among consumers. For example, in accordance with such an implementation, a single commercial incentive will automatically propagate to consumers in a first social network. Then, when members of the first social network come into contact with other consumers via proximity networks, those other consumers will receive the commercial incentive. The commercial incentive will then propagate through the social networks associated with those other consumers. The process will continue in this fashion, resulting in the widespread distribution of the commercial incentive among consumers.

In some implementations of the present invention, automatic redistribution may be limited or qualified based on preferences and/or user data associated with the potential redistributor and/or recipient of the commercial incentive. These preferences and/or user data may be stored locally with respect to a consumer device or stored remotely and accessed via a network. For example, a consumer may explicitly specify that he/she does not wish to redistribute/receive commercial incentives or may specify preferences concerning the amount, frequency, origin, or type of commercial incentives to be redistributed and/or received. Furthermore, such preferences may be derived or inferred from user data associated with the consumer, wherein such consumer data may include but is not limited to numerous temporal, spatial, social and topical data associated with the consumer. One benefit of such qualified redistribution of commercial incentives is to prohibit the receipt of undesired or irrelevant commercial incentives by a consumer and to increase the delivery of explicit offers when considering an actual purchase (e.g., when buying a car).

In a further implementation of the present invention, the content and/or terms associated with a commercial incentive may be dynamically augmented upon redistribution to another consumer. This dynamic augmentation may be performed by the redistributing consumer device, the receiving consumer device, or by an entity connected to these devices via a network (such as commercial incentive engine 102). The manner in which the commercial incentive is augmented may be based on, for example, any of a variety of factors relating to the sender and/or recipient of the redistributed commercial incentive, including spatial, temporal, social and topical data associated with the sender and/or recipient. In one embodiment, the value of the redistributed commercial incentive may vary depending on the degree to which the redistributor and the recipient are related within a particular social network or the degree to which the redistributor and the recipient are related to the advertiser. However, this is only one example, and persons skilled in the relevant art(s) will appreciate that other factors may be used to determine the manner in which a redistributed commercial incentive should be augmented.

E. Distribution/Redistribution of Commercial Incentives by Network Nodes

Figure 15:
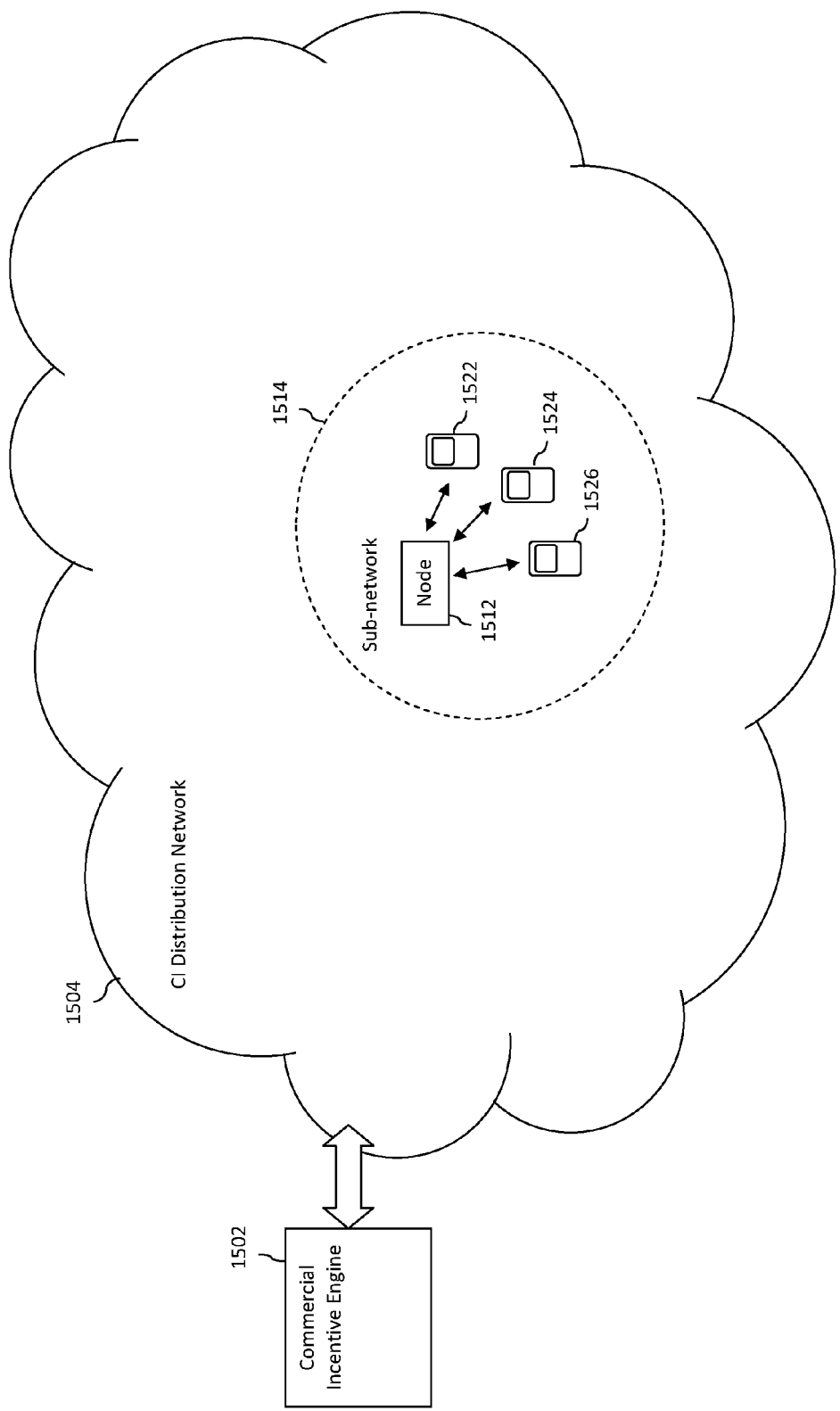
FIG. 15 is a block diagram of a system that includes a node that receives, stores, distributed and redistributes commercial incentives in accordance with an embodiment of the present invention.

In accordance with an embodiment of the present invention, commercial incentives may be received, stored, distributed and/or redistributed by a node within a CI distribution network, such as CI distribution network 104. FIG. 15 illustrates an example system 1500 that includes such a node. In particular, as shown in FIG. 15, system 1500 includes a commercial incentive engine 1502 that is communicatively connected to a CI distribution network 1504. CI distribution network 1504 in turn includes a network node 1512 that manages a sub-network 1514 within CI distribution network 1504. In one embodiment of the present invention, node 1512 is a wireless access point and sub-network 1514 is an 802.11 WLAN, although the invention is not so limited. Commercial incentive engine 1502 may be implemented in the same manner as commercial incentive engine 102 as described above in reference to FIGS. 1 and 2 or commercial incentive engine 800 as described above in reference to FIG. 8.

As consumer devices pass within the transmission range of node 1512 such devices become communicatively connected to node 1512. In FIG. 15, three such consumer devices 1522, 1524 and 1526 are shown. When acting as a distributor of commercial incentives, node 1512 receives commercial incentives from commercial incentive engine 1502, stores the commercial incentives locally, and then transmits unique and redeemable copies of the stored commercial incentives to consumer devices that become communicatively connected to node 1512, such as any of consumer devices 1522, 1524 and 1526. When acting as a redistributor of commercial incentives, node 1512 receives commercial incentives from consumer devices that become communicatively connected to node 1512, such as any of consumer devices 1522, 1524 and 1526, stores the commercial incentives locally, and then transmits unique and redeemable copies of the stored commercial incentives to other consumer devices that may become communicatively connected to the node.

Figure 16:
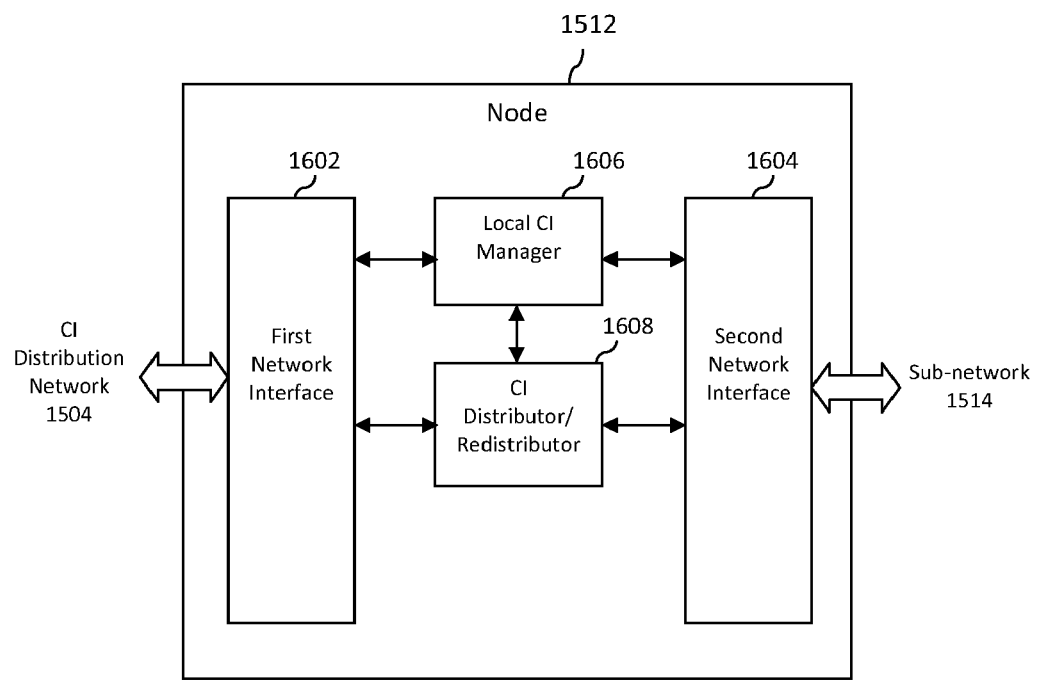
FIG. 16 is a block diagram that shows a node that is configured to distribute and redistribute commercial incentives in accordance with an embodiment of the present invention.

FIG. 16 is a block diagram that shows node 1512 in more detail. As shown in FIG. 16, node 1512 includes a first network interface 1602, a second network interface 1604, a local CI manager 1606, and a CI distributor/redistributor 1608. First network interface 1602 is configured to facilitate communication with other entities or nodes within CI distribution network 1504. Second network interface 1604 is configured to facilitate communication with devices, such as consumer devices, within sub-network 1514. Local CI manager 1606 is configured to store received commercial incentives and to optionally provide an interface by which an owner or operator of node 1512 can manage such commercial incentives. Such commercial incentives may be received from commercial incentive engine 1502 via first network interface 1602 or from consumer devices within range of node 1512 via second network interface 1602. CI distributor/redistributor 1608 is configured to distribute or redistribute copies of commercial incentives stored by local CI manager 1606 to one or more consumer devices within range of node 1512 via second network interface 1604.

A method by which a node within a CI distribution network may distribute commercial incentives in accordance with an embodiment of the present invention will now be described in reference to flowchart 1700 of FIG. 17. The method will be described with continued reference to system 1500 of FIG. 15, although the method is not limited to that implementation.

Figure 17:
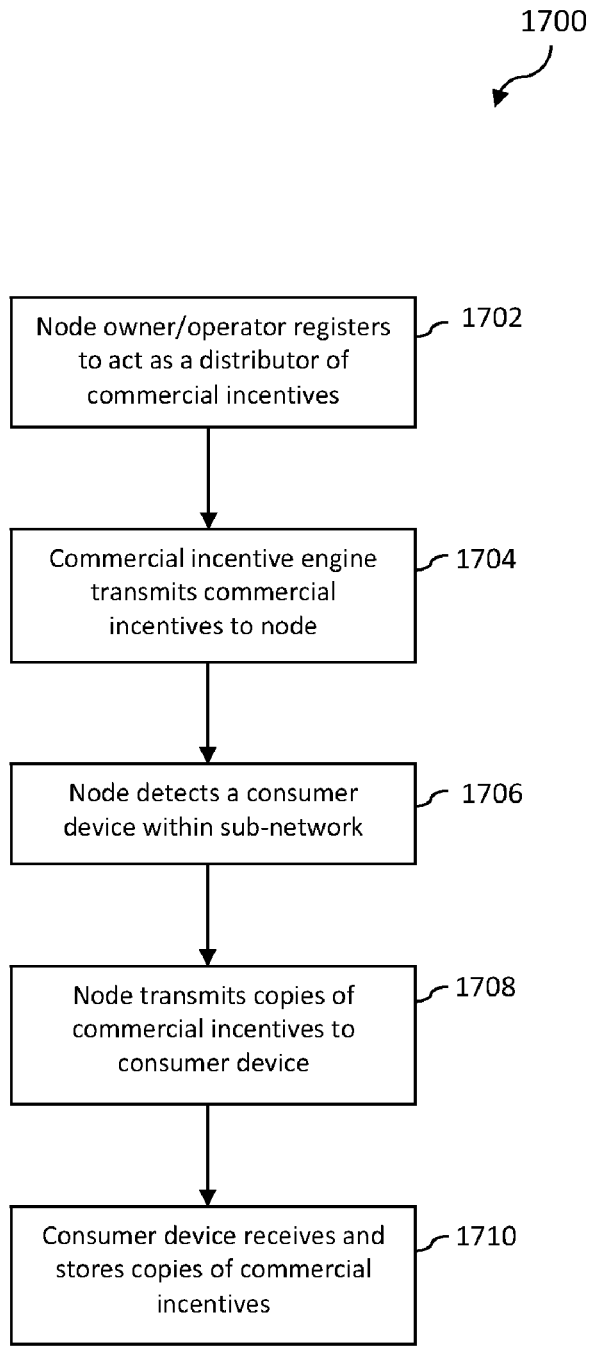
FIG. 17 depicts a flowchart of a method by which a node within a commercial incentive distribution network may distribute commercial incentives in accordance with an embodiment of the present invention.

As shown in FIG. 17, the method of flowchart 1700 begins at step 1702, in which an owner or operator of node 1512 registers with commercial incentive engine 1502 to act as a distributor of commercial incentives. This registration may occur via a publisher registration interface within commercial incentive engine 1502.

At step 1704, responsive to successful registration, commercial incentive engine 1502 transmits commercial incentives to node 1512. The number and type of commercial incentives transmitted to node 1512, as well as the frequency of transmission, may be determined by inventory management functionality located within commercial incentive engine 1502, inventory management functionality located within node 1512, or may be determined based on a negotiation between such functionality located within each component as well as in response to real-time usage/popularity.

Upon receipt of the commercial incentives from commercial incentive engine 1502, node 1512 stores the incentives locally.

At step 1706, node 1504 detects a consumer device to which it is communicatively connected via sub-network 1514 and optionally determines whether the consumer device is eligible to receive a copy of the commercial incentives received in step 1704. Determining whether a consumer device is eligible to receive a copy of a commercial incentive may entail communicating with the consumer device or another entity (e.g., commercial incentive engine 102) to obtain eligibility information relating to a consumer associated with the consumer device. Such eligibility information may include but is not limited to configuration and/or preference data explicitly provided by the consumer or information derived from user data associated with the consumer.

At step 1708, responsive to detecting the consumer device and to optionally determining that the consumer device is eligible to receive copies of the commercial incentives received in step 1704, node 1504 creates a copy of each of the commercial incentives and transmits the copies to the consumer device. During or subsequent to this step, node 1504 may also communicate with a distribution manager within commercial incentive engine 1502 to notify the distribution manager that the distribution has occurred, so that the distribution manager can track the newly-created and distributed copies of the commercial incentives.

At step 1710, the consumer device receives and stores the copies of the commercial incentives. During or subsequent to this step, the consumer device may also communicate with a distribution manager within commercial incentive engine 1502 to notify the distribution manager of the receipt of the commercial incentives, so that the distribution manager can track the newly-created and distributed copies of the commercial incentives and update node data.

A method by which node within a CI distribution network may redistribute commercial incentives in accordance with an embodiment of the present invention will now be described in reference to flowchart 1800 of FIG. 18. The method will be described with continued reference to system 1500 of FIG. 15, although the method is not limited to that implementation.

Figure 18:
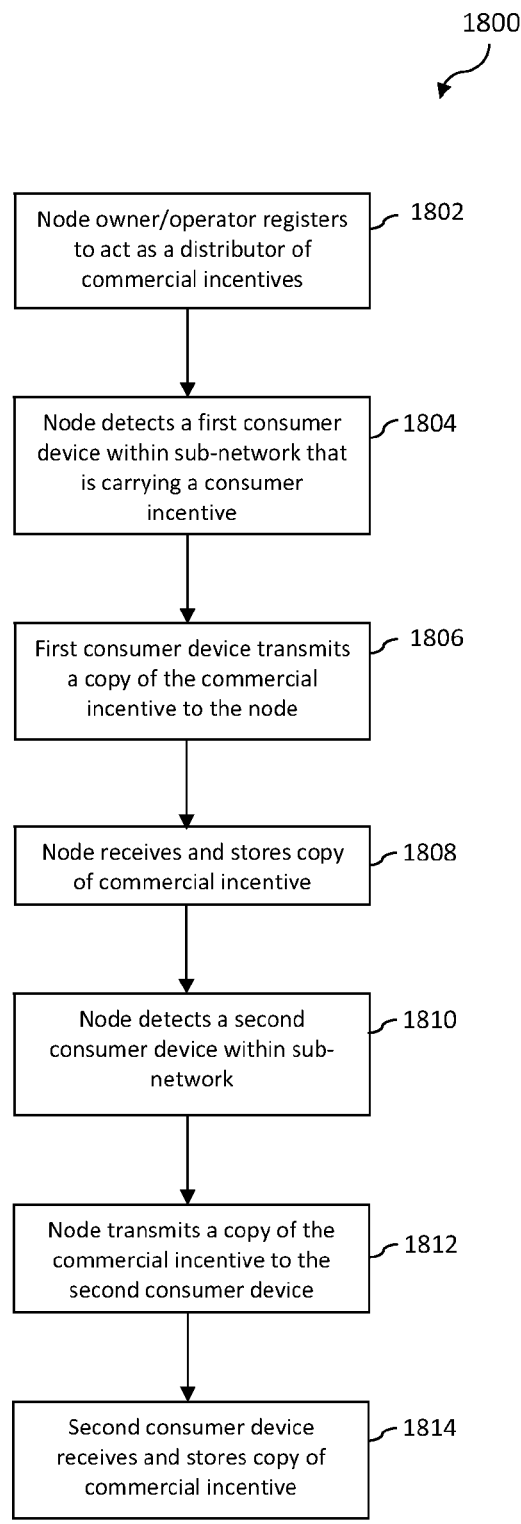
FIG. 18 depicts a flowchart of a method by which a node within a commercial incentive distribution network may redistribute commercial incentives in accordance with an embodiment of the present invention.

As shown in FIG. 18, the method of flowchart 1800 begins at step 1802, in which an owner or operator of node 1512 registers with commercial incentive engine 1502 to act as a redistributor of commercial incentives. This registration may occur via a publisher registration interface within commercial incentive engine 1502.

At step 1804, node 1504 detects a first consumer device within sub-network 1514 that is carrying a consumer incentive. This step may optionally include determining that node 1504 is eligible to receive the commercial incentive from the first consumer device. The eligibility checking may be performed by node 1504, the first consumer device, or by both.

At step 1806, the first consumer device transmits a copy of the commercial incentive to node 1504. The process by which the copy of the commercial incentive is transmitted may be initiated by node 1504 or the first consumer device depending on the implementation. At step 1808, node 1504 receives the copy of the commercial incentive and stores it locally. During or subsequent to these steps, the first consumer device and/or node 1504 may also communicate with a distribution manager within commercial incentive engine 1502 to notify the distribution manager about the transfer of the commercial incentive, so that the distribution manager can track the newly-created and redistributed copy of the commercial incentive and update user/node data.

At step 1810, node 1504 detects a second consumer device within sub-network 1514. This step may optionally include determining that the second consumer device is eligible to receive a copy of the commercial incentive stored in step 1808. The eligibility checking may be performed by node 1504, the second consumer device, or by both.

At step 1812, node 1504 transmits a copy of the commercial incentive to the second consumer device. The process by which the copy of the commercial incentive is transmitted may be initiated by node 1504 or the second consumer device depending upon the implementation. At step 1814, the second consumer device receives the copy of the commercial incentive and stores it locally. During or subsequent to these steps, node 1504 and/or the second consumer device may also communicate with a distribution manager within commercial incentive engine 1502 to notify the distribution manager about the transfer of the commercial incentive, so that the distribution manager can track the newly-created and redistributed copy of the commercial incentive.

The use of a distribution/redistribution node such as node 1504 advantageously allows a business owner to transmit commercial incentives to any consumer passing within communication range of the node. Thus, for example, a restaurant owner could use such a distribution/redistribution node to broadcast commercial incentives relating to certain menu items to consumers passing within a certain distance of their storefront because such consumers are more likely to take advantage of the promotion than consumers who are more remotely located.

When combined with an implementation that allows for targeted redistribution of commercial incentives among consumers (as discussed above in Section D), additional benefits may be achieved. For example, assume that a first consumer passes within communication range of the distribution/redistribution node discussed above and receives a copy of a commercial incentive relating to a menu item. Although this first consumer may not be interested in the promotion, the first consumer may later pass a second consumer outside of the communication range of the distribution/redistribution node and automatically redistribute the commercial incentive to the second consumer based on an indication that the second consumer enjoys the type of cuisine offered by the restaurant.

A distribution/redistribution node need not be exclusively associated with a single business, but may also act as a hub for receiving and transmitting commercial incentives associated with a plurality of businesses. For example, a community of business owners may agree to implement nodes that transmit and receive commercial incentives associated with each other's businesses. Furthermore, an owner/operator of a node may be compensated for distributing/redistributing commercial incentives associated with third party businesses. Compensation may be based, for example, on the number of commercial incentives stored, distributed, or redistributed by the node or based on a share of the revenue generated by the redemption of commercial incentives distributed/redistributed by the node.

The set of commercial incentives made available for distribution/redistribution by a node at any given time can be a programmatic combination of the commercial incentives held, distributed or redeemed by the users of the node and spatial, temporal, social and topical patterns among them. In accordance with one implementation of the present invention, a distribution/redistribution node can weight consumers and/or commercial incentives in order to provide a better experience or targeting of commercial incentives.

Figure 19:
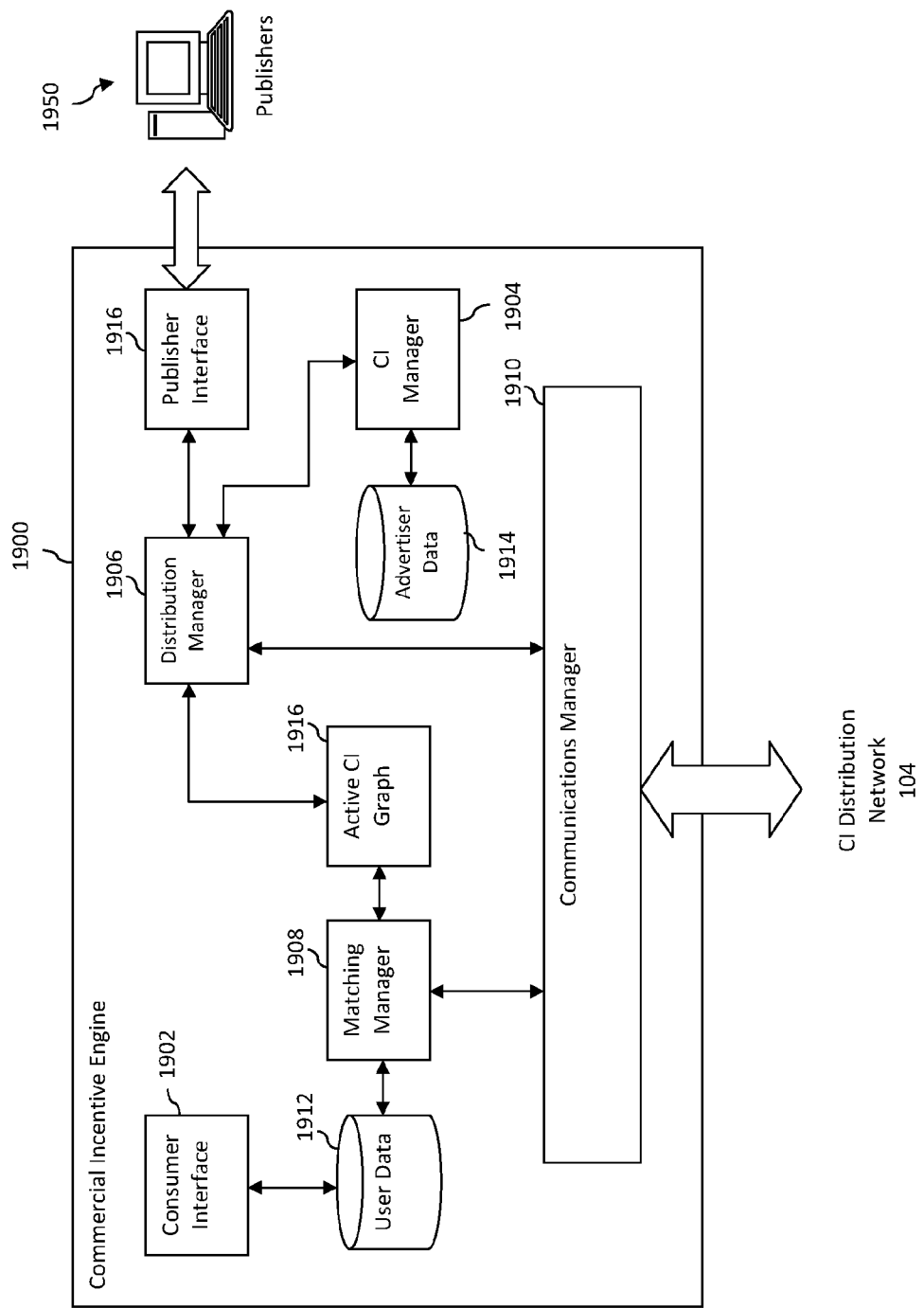
FIG. 19 is a block diagram of a commercial incentive engine in accordance with an alternate embodiment of the present invention that includes a publisher interface.

FIG. 19 is a block diagram of a commercial incentive engine 1900 in accordance with an alternate embodiment of the present invention that includes a publisher interface 1916. Publisher interface 1916 is configured to allow an owner or operator of a node to register the node with commercial incentive engine 1900 for the purposes of distributing and/or redistributing commercial incentives. The registration process may allow the node owner/operator to provide identification information concerning the owner/operator and/or the node as well as to specify parameters concerning the receipt, distribution and redistribution of commercial incentives. Such parameters may include a specification of the desired type, volume, and frequency of delivery of commercial incentives to be transmitted from commercial incentive engine 1900 to the node. Publisher interface 1916 may also be configured to allow a node owner/operator to provide information that facilitates the making of payments to the owner/operator upon redemption of commercial incentives that were distributed or redistributed by the node.

As shown in FIG. 19, in addition to publisher interface 1916, commercial incentive engine 1900 includes a number of communicatively-connected elements including a consumer interface 1902, a CI manager 1904, a distribution manager 1906, a matching manager 1908, a communications manager 1910, a user data database 1912, an advertiser data database 1914, and an active CI graph 1916. With the exception of certain functions to be described immediately below, each of these elements is configured to perform essentially the same functions as described above in reference to like-named elements of commercial incentive engine 102.

To facilitate redistribution, consumer interface 1902 may be further configured to allow a consumer to indicate whether or not he/she wishes to participate in the redistribution of commercial incentives, to specify preferences pertaining to both the sending and receiving of redistributed commercial incentives, and to provide information that facilitates the making of payments (or the delivery of other incentives or items of value) to the consumer upon redemption of commercial incentives that were redistributed by the consumer.

To facilitate distribution and redistribution, distribution manager 1906 may be further configured to authorize, manage and/or track the distribution of commercial incentives from nodes within CI distribution network 104, and to authorize, manage and/or track the redistribution of commercial incentives from nodes and consumer devices within CI distribution network 104. The management of the distribution/redistribution of commercial incentives from a node may include managing the inventory of commercial incentives currently stored by or made available to a node. Matching manager 1808 may be further configured to match commercial incentives to distribution/redistribution nodes based on registration information associated with the nodes.

Communications manager 1910 may be further configured to receive requests for commercial incentives from distribution/redistribution nodes within CI distribution network 104 and to pass such requests on to distribution manager 1806. Communications manager 1910 may also be further configured to transmit commercial incentives to distribution/redistribution nodes within CI distribution network 104 responsive to signals received from distribution manager 1806 and/or matching manager 1908.

Figure 20:
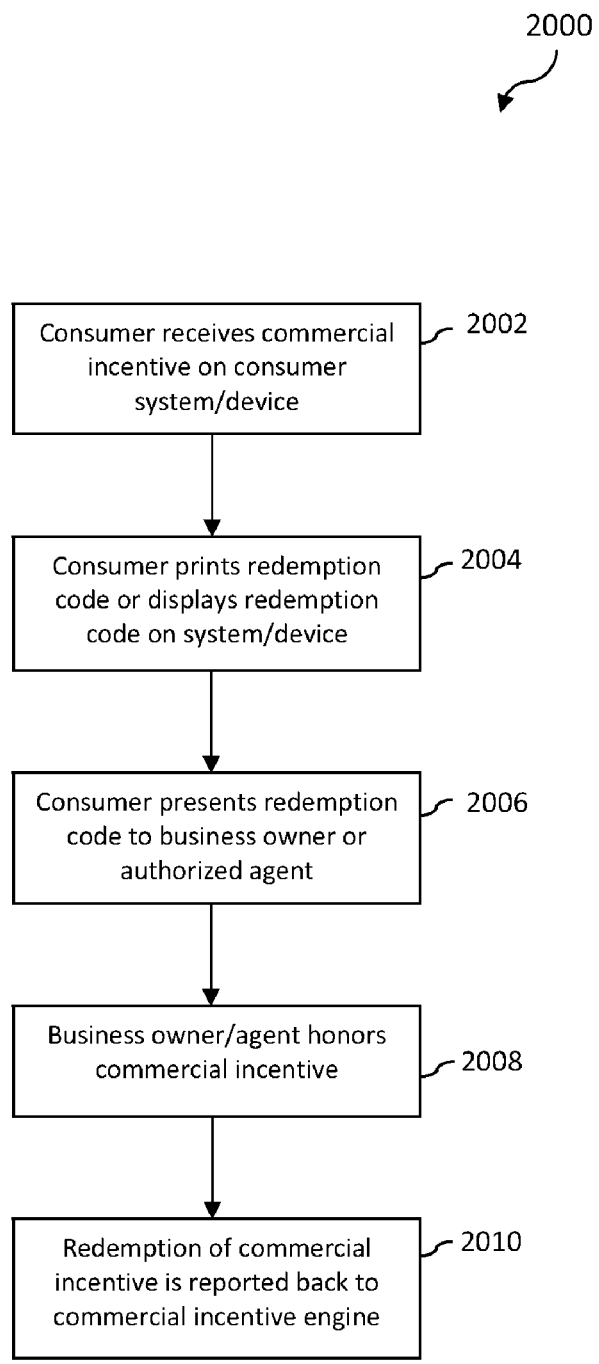
FIG. 20 depicts a flowchart of a method for receiving and redeeming a commercial incentive in accordance with an embodiment of the present invention.

F. Redemption and Compensation for Distribution/Redistribution of Commercial Incentives FIG. 20 depicts a flowchart 2000 of a method for receiving and redeeming a commercial incentive in accordance with an embodiment of the present invention. The method of flowchart 2000 is described herein by way of example only and is not intended to limit the present invention.

As shown in FIG. 20, the method of flowchart 2000 begins at step 2002, in which a consumer receives a commercial incentive on a consumer system/device. As described in detail above, in accordance with various embodiments of the present invention, the commercial incentive may be received from a commercial incentive engine, from a distribution/redistribution node, or from another consumer system/device.

At step 2004, the consumer either prints a redemption code associated with the commercial incentive or displays the redemption code on the consumer system/device. It may be preferable to print the redemption code where the consumer system/device is a stationary system, such as a desktop personal computer (PC). Displaying the redemption code on the consumer system/device may be preferable where the consumer system/device is a portable system/device, such as a handheld computing device, cellular phone, personal digital assistant, portable media player, or the like.

Redemption can also occur automatically between a consumer system/device and a business owner's physical location node. This business node is responsible for communicating with a commercial incentive engine, but can also communicate with commercial incentive bearing/redeeming devices through local proximity networks.

At step 2006, the consumer presents the redemption code to a business owner or an authorized agent (e.g., a sales representative or cashier) of the business owner. Responsive to the presentation of the redemption code, the business owner or agent honors the commercial incentive as shown at step 2008. Honoring the commercial incentive may include, but is not limited to, providing the consumer with a discount or rebate relating to a particular product or service or providing free products or services to the consumer. Redemption can be automated through a local business node, triggered by a consumer entering a store, by the consumer selecting or activating a commercial incentive on a consumer device, by a local agent, or the like.

At step 2010, the business owner or agent (or a system used by the business owner or agent), reports the redemption of the commercial incentive back to the advertiser who sponsored the commercial incentive and/or to a commercial incentive engine that originally distributed the commercial incentive. This reporting may also be handled automatically by a local business node.

In accordance with embodiments of the present invention, various monetization models and revenue-sharing arrangements may be used to compensate the owner/operator of a commercial incentive engine, an owner/operator of a distribution/redistribution node, or a consumer that has distributed or redistributed a consumer incentive. Depending upon the implementation, compensation may occur at the time of distribution or redistribution and/or upon redemption.

Figure 21:
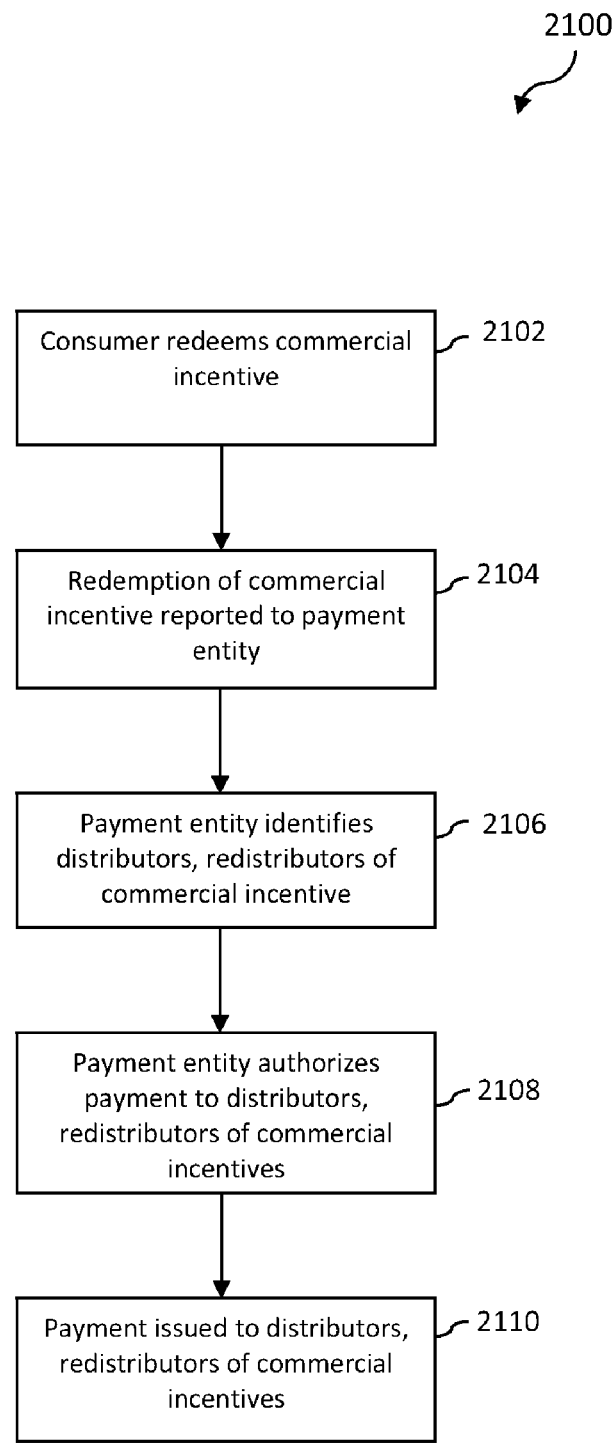
FIG. 21 depicts a flowchart of a method for compensating distributors and/or redistributors of a commercial incentive in accordance with an embodiment of the present invention

FIG. 21 depicts a flowchart 2100 of a method for compensating distributors and/or redistributors of a commercial incentive in accordance with an embodiment of the present invention. In accordance with the method of flowchart 2100, compensation occurs upon redemption of a commercial incentive, although the invention is not limited to distributing compensation upon redemption only.

As shown in FIG. 21, the method of flowchart 2100 begins at step 2102, in which a consumer redeems a commercial incentive. As noted above, redemption of a commercial incentive may include presenting a redemption code associated with the commercial incentive to a business owner or authorized agent thereof, although the invention is not so limited.

At step 2104, the redemption of the commercial incentive in step 2102 is reported to a payment entity. In an embodiment in which an owner/operator of a commercial incentive engine is the payment entity, this step may entail reporting the redemption of the commercial incentive to the commercial incentive engine. In an alternative embodiment in which a party other than the owner/operator of the commercial incentive engine is the payment entity, this step may entail reporting the redemption of the commercial incentive directly to the other party or to the commercial incentive engine for transmission to the other party.

At step 2106, the payment entity identifies any distributors and/or redistributors of the commercial incentive. As discussed in detail above, distributors may include an owner/operator of a commercial incentive engine or an owner/operator of a distribution/redistribution node, while redistributors may include one or more distribution/redistribution nodes or consumers. To perform this function, tracking information stored by a distribution manager within a commercial incentive engine (such as distribution manager 206 within commercial incentive engine 102) may be used. Alternatively or additionally, tracking information stored along with the redeemed copy of the commercial incentive may be used. Such tracking information may identify each entity that has distributed or redistributed the commercial incentive.

At step 2108, the payment entity authorizes payment to distributors and/or redistributors of the commercial incentive and at step 2110 payment is issued. All distributors and/or redistributors may receive payment or only selected distributors and/or redistributors may receive payment as determined in accordance with some predetermined algorithm. Furthermore, the amount of payment may be determined based on a variety of factors, including an allocated share of the revenue associated with redemption of the commercial incentive.

Depending upon the implementation, the allocated revenue share may be fixed or dynamic. For example, the allocated revenue share for a consumer may be dynamically determined based on past performance, reputation, total spend, intimacy between sender and recipient, or the like. In one example implementation in which revenue share is based on intimacy between sender and recipient, a consumer may receives more revenue share for passing a commercial incentive to a stranger that redeems it than for passing a commercial incentive to someone with whom they are more intimate, thereby encouraging the consumer to distribute the commercial incentive to strangers. Revenue-sharing among the owners/operators of distribution/redistribution nodes may also be determined based on various criteria such as but not limited to specific minimum spend, traffic quality and total spend.

Since a commercial incentive engine in accordance with an embodiment of the present invention can modify terms and state associated with any commercial incentive not yet redeemed or locked into a value, another embodiment of the present invention could provide owners/operators of distribution/redistribution nodes with the ability to modify their revenue-sharing and other promotional efforts. Such real-time dynamic ability could be used to allow advertisers and owners/operators of distribution/redistribution nodes to increase lead/traffic generation or quality of leads/traffic.

The foregoing method may be advantageously used to reward or compensate publishers, consumers and other parties along the distribution path of the commercial incentive for their role in transferring the commercial incentive to the consumer who finally redeems it.

Still other methods may be used in accordance with various implementations of the present invention to incentivize consumers to participate in the dissemination and utilization of commercial incentives. For example, in one embodiment, users are incentivized to use the commercial incentive engine and CI distribution network by running a contest that rewards consumers for various achievements such as most coupons used, most coupons redistributed, most active on the network, or the like.

In another embodiment of the present invention, a consumer is always compensated beyond the basic value of the commercial incentive that is redeemed in the form of network credit or user rewards.

In still another embodiment of the present invention, consumers are tiered according to network participation a tier-based value multiplier is assigned for any commercial incentive that a consumer redeems. For example, all base consumers might have a multiplier of 1.0 so that their commercial incentives all had face value, while more experienced and/or active consumers could advance with an individual multiplier applied to all their commercial incentives, such as 1.50 times the commercial incentive value. The value differential could be absorbed by the advertiser and/or distributor/redistributor via a reduction in the allocated share of the revenue/market spend. Multipliers could be applied across the board for any subject matter or could be variable based upon the subject matter and specific consumer activity. For example, a consumer that writes a lot of network reviews relating to cars, that busy a lot of car products and passes along commercial incentives to others for car products might have an automotive multiplier that is higher than a Chinese food multiplier.

G. Example Computer System Implementation

Each of the components of commercial incentive engines 102, 800 and 1900 described above in reference to FIGS. 1, 8 and 19, respectively, may be implemented alone or in combination by any well-known processor-based computer system. Likewise, each of first and second consumer devices 1002 and 1004 described above in reference to FIG. 10 and node 1512 described above in reference to FIG. 15, may be implemented by any well known processor-based computer system. An example of such a computer system 2200 is depicted in FIG. 22.

Figure 22:
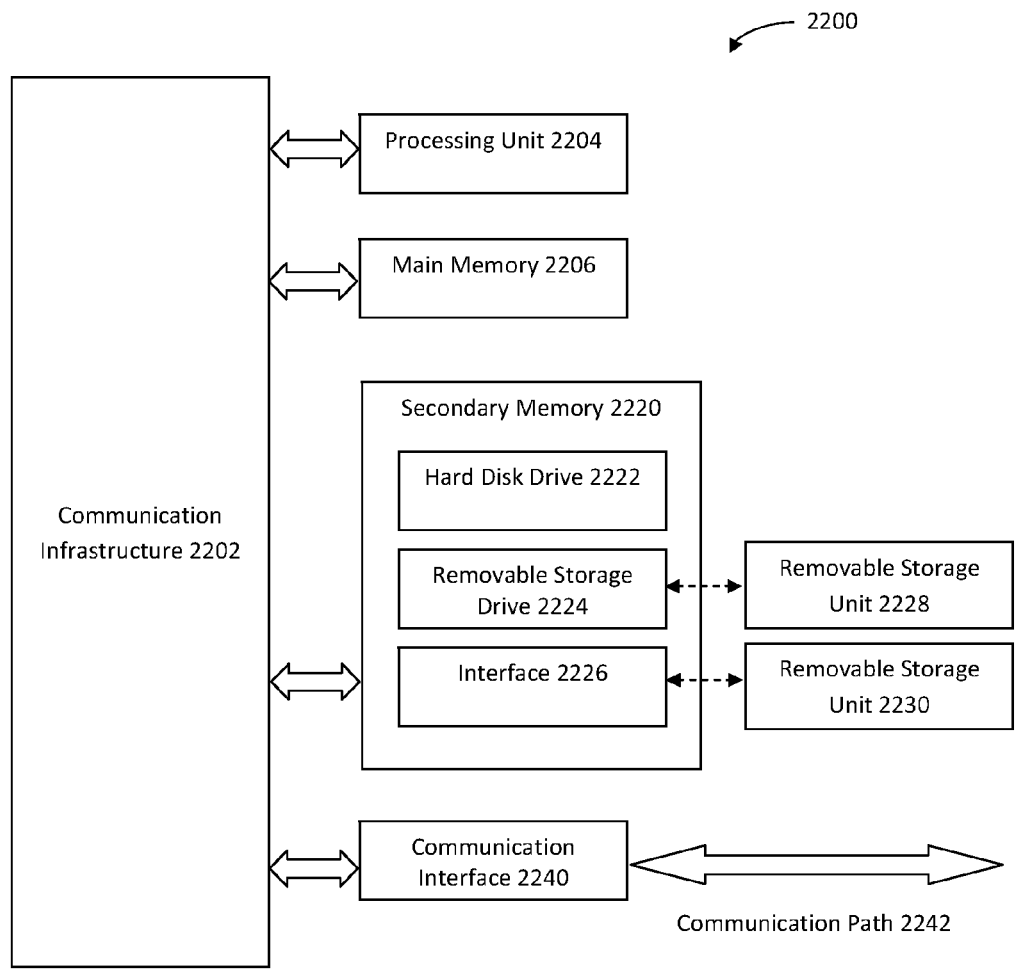
FIG. 22 is a block diagram of an example computer system that may be used to implement aspects of the present invention.

As shown in FIG. 22, computer system 2200 includes a processing unit 2204 that includes one or more processors. Processor unit 2204 is connected to a communication infrastructure 2202, which may comprise, for example, a bus or a network.

Computer system 2200 also includes a main memory 2206, preferably random access memory (RAM), and may also include a secondary memory 2220. Secondary memory 2220 may include, for example, a hard disk drive 2222, a removable storage drive 2224, and/or a memory stick. Removable storage drive 2224 may comprise a floppy disk drive, a magnetic tape drive, an optical disk drive, a flash memory, or the like. Removable storage drive 2224 reads from and/or writes to a removable storage unit 2228 in a well-known manner. Removable storage unit 2228 may comprise a floppy disk, magnetic tape, optical disk, or the like, which is read by and written to by removable storage drive 2224. As will be appreciated by persons skilled in the relevant art(s), removable storage unit 2228 includes a computer usable storage medium having stored therein computer software and/or data.

In alternative implementations, secondary memory 2220 may include other similar means for allowing computer programs or other instructions to be loaded into computer system 2200. Such means may include, for example, a removable storage unit 2230 and an interface 2226. Examples of such means may include a program cartridge and cartridge interface (such as that found in video game devices), a removable memory chip (such as an EPROM, or PROM) and associated socket, and other removable storage units 2230 and interfaces 2226 which allow software and data to be transferred from the removable storage unit 2230 to computer system 2200.

Computer system 2200 may also include a communications interface 2240. Communications interface 2240 allows software and data to be transferred between computer system 2200 and external devices. Examples of communications interface 2240 may include a modem, a network interface (such as an Ethernet card), a communications port, a PCM-CIA slot and card, or the like. Software and data transferred via communications interface 2240 are in the form of signals which may be electronic, electromagnetic, optical, or other signals capable of being received by communications interface 2240. These signals are provided to communications interface 1640 via a communications path 2242. Communications path 2242 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 2228, removable storage unit 2230, a hard disk installed in hard disk drive 2222, and signals received by communications interface 2240. Computer program medium and computer useable medium can also refer to memories, such as main memory 2206 and secondary memory 2220, which can be semiconductor devices (e.g., DRAMs, etc.). These computer program products are means for providing software to computer system 2200.

Computer programs (also called computer control logic, programming logic, or logic) are stored in main memory 2206 and/or secondary memory 2220. Computer programs may also be received via communications interface 2240. Such computer programs, when executed, enable the computer system 2200 to implement features of the present invention as discussed herein. Accordingly, such computer programs represent controllers of the computer system 2200. Where the invention is implemented using software, the software may be stored in a computer program product and loaded into computer system 2200 using removable storage drive 2224, interface 2226, or communications interface 1640.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

H. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

For example, although many of the commercial incentives described above relate to discounts or rebates associated with a product or service, the present invention is not limited to such classic coupon models. Indeed, an embodiment of the present invention may support other diverse incentive models that may be designed by an advertiser to achieve a business objective. For example, a commercial incentive could be created for in-store events, free samples, or product launch events to drive traffic, and commercial incentives can also be combined with other interactive customer retention and/or marketing surveys that can increase the reputation of the consumer and/or the value of an associated consumer incentive including co-branding and collaborative commercial incentive creation in real-time.

Further, the commercial incentive engine and CI distribution network described above is not limited to the distribution of business-originated commercial incentives but could also be used by consumers in one-off or private commercial activities generally associated with classified ads. Thus, in accordance with one embodiment of the present invention, each person on the network represents both a consuming and distribution node, and the commercial incentive engine includes facilities for consumer-originated commercial incentives to be created, distributed and redeemed through the network.

Finally, although one or more embodiments of the present invention have been described in reference to commercial incentives, persons skilled in the relevant art(s) will readily appreciate that the embodiments of the present invention described herein can also be used to distribute, manage and redeem non-commercial incentives as well. For example and without limitation, such non-commercial incentives may include incentives to perform acts of charity, public service, or civic duty. Thus, the foregoing description of commercial incentives should not limit the present invention.

What is claimed is:

1. A system for automatically distributing electronic coupons to consumers, comprising:
   at least a first database configured to store targeting data associated with a plurality of electronic coupons, wherein the targeting data includes at least a target geographic region associated with each electronic coupon and a target area of interest associated with each electronic coupon;
   at least a second database configured to store user data associated with each of a plurality of consumers that have registered to receive electronic coupons via a user interface to the system, the user data comprising at least a geographic region associated with each consumer, an area of interest specified by each consumer via the user interface to the system, and an area of interest determined by analyzing prior commercial transactions of each consumer;
   one or more computers having software, wherein the one or more computers are communicatively coupled to at least the first database and the second database and wherein upon execution of the software by the one or more computers, the one or more computers are configured to:

obtain the targeting data associated with the plurality of electronic coupons and the user data associated with each of the plurality of consumers that have registered to received electronic coupons;

match the electronic coupons to the consumers by matching the targeting data associated with the electronic coupons to the user data associated with the consumers; and distribute each electronic coupon to at least one consumer with which the electronic coupon has been matched;

wherein the one or more computers are configured to match a particular electronic coupon to a particular consumer by at least matching the target geographic region associated with the particular electronic coupon to the geographic region associated with the particular consumer, matching the target area of interest associated with the particular electronic coupon to the area of interest specified by the particular consumer, and matching the target area of interest associated with the particular electronic coupon to the area of interest determined by analyzing the prior commercial transactions of the particular consumer.

2. The system of claim 1, wherein the one or more computers are further configured to distribute an electronic coupon to a consumer by distributing the electronic coupon to a user device associated with the consumer.

3. The system of claim 1, wherein at least one electronic coupon comprises a discount or rebate relating to a particular product or service.

4. The system of claim 1, wherein:

the targeting data associated with each electronic coupon further comprises a target time period, the user data associated with each consumer further comprises temporal data associated with each consumer, and the one or more computers are configured to match the particular electronic coupon to the particular consumer by also determining that the temporal data associated with the particular consumer falls within the target time period associated with the particular electronic coupon.

5. The system of claim 1, wherein:

the targeting data associated with each electronic coupon further includes an identity of a user that has at least received the commercial incentive;

the user data associated with each consumer further comprises social data that identifies a group of users with whom each consumer is socially connected, and the one or more computers are configured to match the particular electronic coupon to the particular consumer by also determining that a user that has at least received the particular electronic coupon is within the group of users with whom the particular consumer is socially connected.

6. The system of claim 1, wherein:

the targeting data associated with each electronic coupon further includes one or more of a target age, a target gender, a target marital status, a target home ownership status, a target socioeconomic status, and target life cycle status, the user data associated with each consumer further includes one or more of an age, a gender, a marital status, a home ownership status, a socioeconomic status and a life cycle status associated with each consumer, and the one or more computers are configured to match the particular electronic coupon to the particular consumer by also matching at least one of the target age, the target gender, the target marital status, the target home ownership status, the target socioeconomic status and the target life cycle status associated with the particular electronic coupon to a corresponding one or more of the age, the gender, the marital status, the home ownership status, the socioeconomic status and the life cycle status associated with the particular consumer.

7. The system of claim 6, wherein at least one of the age, the gender, the marital status, the home ownership status, the socioeconomic status and the life cycle status associated with the particular consumer are specified by the particular consumer via the user interface to the system.

8. The system of claim 1, wherein the geographic region associated with each consumer includes or is derived from one or more of:

data entered into a user device by the consumer;
cell tower data;
GPRS data;
global positioning service (GPS) data;
WI-FI data;
personal area network data; or
IP address data.

9. A method, comprising:

storing targeting data associated with a plurality of electronic coupons in at least a first database, wherein the targeting data includes at least a target geographic region associated with each electronic coupon and a target area of interest associated with each electronic coupon;

storing user data associated with each of a plurality of consumers that have registered to receive electronic coupons in at least a second database, the user data comprising at least a geographic region associated with each consumer, an area of interest specified by each consumer, and an area of interest determined by analyzing prior commercial transactions of each consumer;

obtaining, by at least one processor-based computer system that is communicatively coupled to at least the first database and the second database, the targeting data associated with the plurality of electronic coupons and the user data associated with each of the plurality of consumers that have registered to receive electronic coupons;

matching, by the at least one processor-based computer system, the electronic coupons to the consumers by matching the obtained targeting data to the obtained user data, wherein the matching comprises matching a particular electronic coupon to a particular consumer by matching the target geographic region associated with the particular electronic coupon to the geographic region associated with the particular consumer, matching the target area of interest associated with the particular electronic coupon to the area of interest specified by the particular consumer, and matching the target area of interest associated with the particular electronic coupon to the area of interest determined by analyzing the prior commercial transactions of the particular consumer; and distributing, by the at least one-processor based computer system, each electronic coupon to at least one consumer with which the electronic coupon has been matched.

10. The method of claim 9, wherein distributing each electronic coupon to the at least one consumer with which the electronic coupon has been matched comprises distributing each electronic coupon to a user device associated with the at least one consumer with which the electronic coupon has been matched.

11. The method of claim 9, wherein at least one electronic coupon comprises a discount or rebate relating to a particular product or service.

12. The method of claim 9, wherein:
the targeting data associated with each electronic coupon further comprises a target time period,
the user data associated with each consumer further comprises temporal data associated with each consumer, and
matching the particular electronic coupon to the particular consumer further comprises determining that the temporal data associated with the particular consumer falls within the target time period associated with the particular electronic coupon.

13. The method of claim 9, wherein:
the targeting data associated with each electronic coupon further includes an identity of a user that has at least received the commercial incentive;
the user data associated with each consumer further comprises social data that identifies a group of users with whom each consumer is socially connected, and
matching the particular electronic coupon to the particular consumer further comprises determining that a user that has at least received the particular electronic coupon is within the group of users with whom the particular consumer is socially connected.

14. The method of claim 9, wherein:
the targeting data associated with each electronic coupon further includes one or more of a target age, a target gender, a target marital status, a target home ownership status, a target socioeconomic status, and target life cycle status,
the user data associated with each consumer further includes one or more of an age, a gender, a marital status, a home ownership status, a socioeconomic status and a life cycle status associated with each consumer, and
matching the particular electronic coupon to the particular consumer further comprises matching at least one of the target age, the target gender, the target marital status, the target home ownership status, the target socioeconomic status and the target life cycle status associated with the particular electronic coupon to a corresponding one or more of the age, the gender, the marital status, the home ownership status, the socioeconomic status and the life cycle status associated with the particular consumer.

15. The method of claim 14, further comprising:
providing a user interface by which the particular consumer can specify at least one of the age, the gender, the marital status, the home ownership status, the socioeconomic status and the life cycle status associated with the particular consumer.

16. The method of claim 9, further comprising determining the geographic region associated with each consumer based on one or more of:
data entered into a user device by the consumer;
cell tower data;
GPRS data;
global positioning service (GPS) data;
WI-FI data;
personal area network data; or
IP address data.

17. A computer program product comprising a computer-readable storage unit having computer program logic recorded thereon that, when executed by a processing unit, causes the processing unit to perform operations, the computer program logic comprising:
logic that, when executed by the processing unit, causes the processing unit to store targeting data associated with a plurality of electronic coupons in at least a first database, wherein the targeting data includes at least a target geographic region associated with each electronic coupon and a target area of interest associated with each electronic coupon;
logic that, when executed by the processing unit, causes the processing unit to store user data associated with each of a plurality of consumers that have registered to receive electronic coupons in at least a second database, the user data comprising at least a geographic region associated with each consumer, an area of interest specified by each consumer, and an area of interest determined by analyzing prior commercial transactions of each consumer;
logic that, when executed by the processing unit, causes the processing unit to obtain the targeting data associated with the plurality of electronic coupons and the user data associated with each of the plurality of consumers that have registered to receive electronic coupons;
logic that, when executed by the processing unit, causes the processing unit to match the electronic coupons to the consumers by matching the obtained targeting data to the obtained user data, wherein the matching comprises matching a particular electronic coupon to a particular consumer by matching the target geographic region associated with the particular electronic coupon to the geographic region associated with the particular consumer, matching the target area of interest associated with the particular electronic coupon to the area of interest specified by the particular consumer, and matching the target area of interest associated with the particular electronic coupon to the area of interest determined by analyzing the prior commercial transactions of the particular consumer; and
logic that, when executed by the processing unit, causes the processing unit to distribute each electronic coupon to at least one consumer with which the electronic coupon has been matched.

18. The computer program product of claim 17, wherein the computer program logic comprises logic that, when executed by the processing unit, causes the processing unit to distribute each electronic coupon to a user device associated with the at least one consumer with which the electronic coupon has been matched.

19. The computer program product of claim 17, wherein at least one electronic coupon comprises a discount or rebate relating to a particular product or service.

20. The computer program product of claim 17, wherein:
the targeting data associated with each electronic coupon further comprises a target time period,
the user data associated with each consumer further comprises temporal data associated with each consumer, and
the computer program logic comprises logic that, when executed by the processing unit, matches the particular electronic coupon to the particular consumer by also determining that the temporal data associated with the particular consumer falls within the target time period associated with the particular electronic coupon.

21. The computer program product of claim 17, wherein:
the targeting data associated with each electronic coupon further includes an identity of a user that has at least received the commercial incentive;
the user data associated with each consumer further comprises social data that identifies a group of users with whom each consumer is socially connected, and
the computer program logic comprises logic that, when executed by the processing unit, matches the particular electronic coupon to the particular consumer by also determining that a user that has at least received the particular electronic coupon is within the group of users with whom the particular consumer is socially connected.

22. The computer program product of claim 17, wherein:
the targeting data associated with each electronic coupon further includes one or more of a target age, a target gender, a target marital status, a target home ownership status, a target socioeconomic status, and target life cycle status,
the user data associated with each consumer further includes one or more of an age, a gender, a marital status, a home ownership status, a socioeconomic status and a life cycle status associated with each consumer, and
the computer program logic comprises logic that, when executed by the processing unit, matches the particular electronic coupon to the particular consumer by also matching at least one of the target age, the target gender, the target marital status, the target home ownership status, the target socioeconomic status and the target life cycle status associated with the particular electronic coupon to a corresponding one or more of the age, the gender, the marital status, the home ownership status, the socioeconomic status and the life cycle status associated with the particular consumer.

23. The computer program product of claim 22, wherein the computer program logic further comprises:
logic that, when executed by the processing unit, provides a user interface by which the particular consumer can specify at least one of the age, the gender, the marital status, the home ownership status, the socioeconomic status and the life cycle status associated with the particular consumer.

24. The computer program product of claim 17, wherein the computer program logic further comprises logic that, when executed by the processing unit, determines the geographic region associated with each consumer based on one or more of:
data entered into a user device by the consumer;
cell tower data;
GP RS data;
global positioning service (GPS) data;
WI-FI data;
personal area network data; or
IP address data.

\* \* \* \* \*

UNITED STATES PATENT AND TRADEMARK OFFICE
CERTIFICATE OF CORRECTION

PATENT NO. : 8,280,766 B2  Page 1 of 1
APPLICATION NO. : 13/219000
DATED : October 2, 2012
INVENTOR(S) : Christopher W. Higgins et al.

It is certified that error appears in the above-identified patent and that said Letters Patent is hereby corrected as shown below:

In column 40, line 16, in claim 24, delete "GP RS" and insert -- GPRS --, therefor.

Signed and Sealed this
Fourth Day of December, 2012

David J. Kappos
*Director of the United States Patent and Trademark Office*